United States Patent
Shin

(10) Patent No.: US 9,910,174 B2
(45) Date of Patent: Mar. 6, 2018

(54) SEISMIC IMAGING APPARATUS AND METHOD FOR PERFORMING ITERATIVE APPLICATION OF DIRECT WAVEFORM INVERSION

(71) Applicant: SEOUL NATIONAL UNIVERSITY R&DB FOUNDATION, Seoul (KR)

(72) Inventor: Chang-Soo Shin, Seoul (KR)

(73) Assignee: Seoul National University R&DB Foundation, Seoul (KR)

(*) Notice: Subject to any disclaimer, the term of this patent is extended or adjusted under 35 U.S.C. 154(b) by 91 days.

(21) Appl. No.: 14/808,541

(22) Filed: Jul. 24, 2015

(65) Prior Publication Data

US 2016/0025878 A1    Jan. 28, 2016

Related U.S. Application Data

(60) Provisional application No. 62/028,980, filed on Jul. 25, 2014.

(30) Foreign Application Priority Data

Jul. 20, 2015    (KR) ........................ 10-2015-0102111

(51) Int. Cl.
G01V 1/28    (2006.01)

(52) U.S. Cl.
CPC ........ G01V 1/282 (2013.01); *G01V 2210/614* (2013.01); *G01V 2210/67* (2013.01)

(58) Field of Classification Search
CPC ............. G01V 1/282; G01V 2210/614; G01V 2210/67
USPC .................................................... 367/7, 8, 9
See application file for complete search history.

(56) References Cited

FOREIGN PATENT DOCUMENTS

| EP | 2 609 450 B1 | 10/2014 |
|---|---|---|
| KR | 10-2012-0060231 A | 6/2012 |
| KR | 10-2013-0097504 A | 9/2013 |

OTHER PUBLICATIONS

Schlottmann, "Direct waveform inversion by iterative inverse propagation," 2009, downloaded Feb. 21, 2017 from https://arxiv.org/abs/0905.0239, 11 pages.*

(Continued)

*Primary Examiner* — Daniel L Murphy
(74) *Attorney, Agent, or Firm* — NSIP Law

(57) ABSTRACT

A seismic imaging technology, and more specifically, an imaging technology for modelling a subsurface structure by updating a velocity model of each frequency band in the ascending, descending order or any random order of frequency The purpose of the present disclosure is to directly compute the difference between the velocity of the actual subsurface velocity and an initial guess of the velocity.

According to one aspect of the present invention, a seismic imaging apparatus for performing iterative application of the direct waveform inversion to image a subsurface structure of an area to be measured may include a waveform inverter to update a reference velocity model while changing a frequency band in a set order, by using parameter perturbation that is obtained from a virtual scattering source and an updated reference wavefield.

12 Claims, 18 Drawing Sheets

(56) References Cited

OTHER PUBLICATIONS

Kwak, S. et al., "Frequency-domain direct waveform inversion based on perturbation theory," Geophysical Journal International 197.2, 2014 (pp. 987-1001).
Shin, C., "Iterative method of Lippmann-Schwinger Waveform Inversion (LSWI)," English translation of Specification in U.S. Appl. No. 62/028,980, filed Jul. 25, 2014 (1 page).

* cited by examiner

FIG. 7
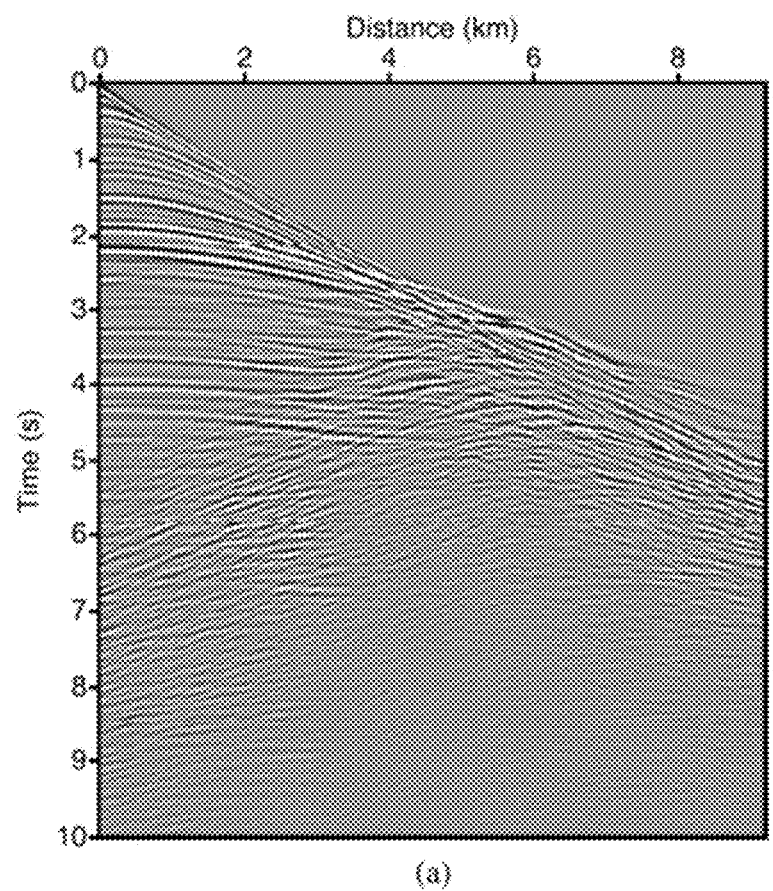
(a)
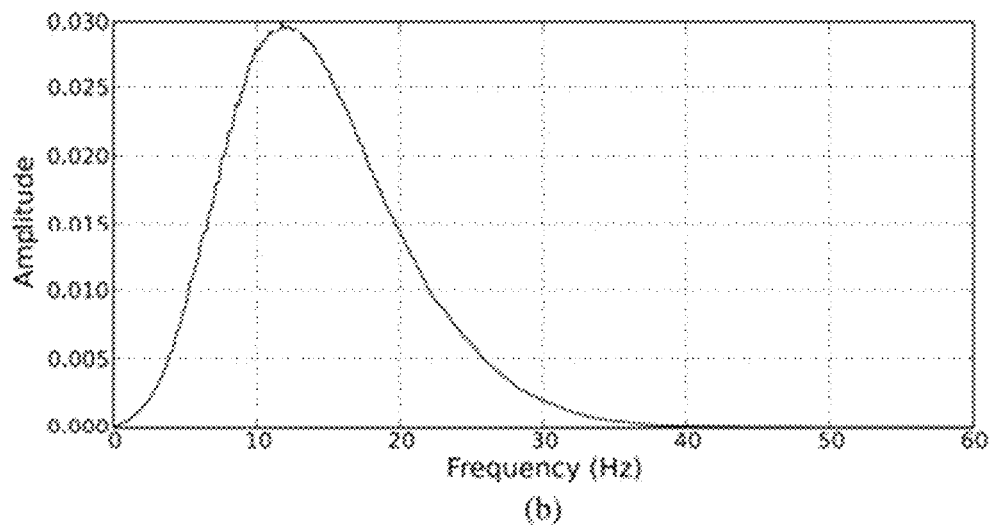
(b)

FIG. 17
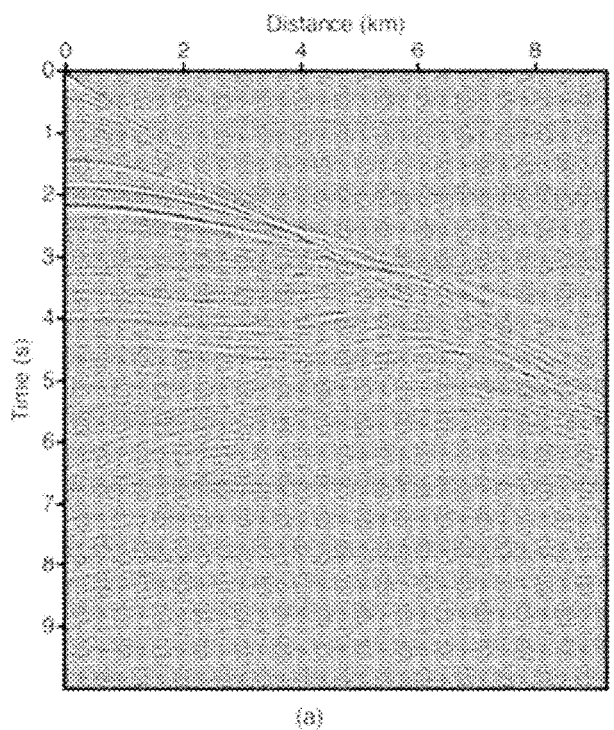
(a)
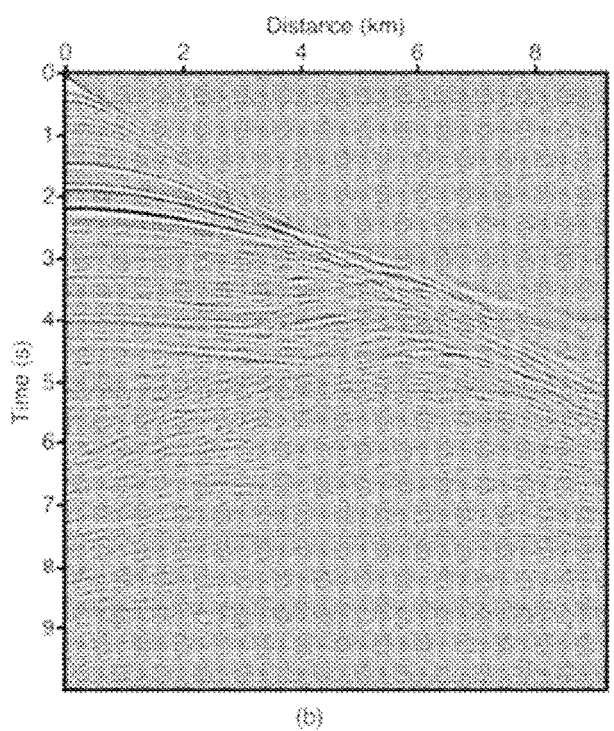
(b)

SEISMIC IMAGING APPARATUS AND METHOD FOR PERFORMING ITERATIVE APPLICATION OF DIRECT WAVEFORM INVERSION

CROSS-REFERENCE TO RELATED APPLICATION(S)

This application claims the benefit under 35 U.S.C. § 119(a) of U.S. Provisional Application No. 62/028,980, filed on Jul. 25, 2014, in the United States Patent and Trademark Office, and Korean Patent Application No. 10-2015-0102111, filed on Jul. 20, 2015, in the Korean Intellectual Property Office, the entire disclosures of which are incorporated herein by reference for all purposes.

BACKGROUND

1. Field

The following description relates to a seismic imaging technology, and more particularly, to an imaging technology for modelling a subsurface structure by updating the velocity model of each frequency band while the frequency band is changed.

2. Description of the Related Art

Seismic tomography is a tool to image the Earth's interior. Geophysicists have conducted researches on seismic tomography to investigate the global-scale structure inside the Earth through passive methods by analyzing signals from natural earthquakes. Exploration geophysicists have used seismic tomography to find gas or oil reservoirs in the upper crust of the Earth from seismic data.

Tomographic methods are generally used to produce an initial velocity model for migrations in exploration geophysics. Of the several available seismic tomographic methods, waveform tomography exploits the full potential of seismic data. Waveform tomography is known as full waveform inversion and has advanced with improvements in computing technology.

Full waveform inversion is to find a structure of velocity according to the depth of stratum through the repeated calculations by using seismic data. To find the solution through the full waveform inversion, the velocity model is required to be iteratively changed so as to minimize the objective function, which is defined as the difference between acquired data and synthetic data, and many methods are proposed to implement such operations (Menke, 1984).

However, the full waveform inversion based on the generalized inversion theory requires the huge amount of time and storage to calculate the Jacobian matrix, configure the Hessian matrix, and compute the matrix or inverse matrix, thereby causing the limit of application.

SUMMARY

The purpose of the present disclosure is to directly compute the difference between the velocity of the actual subsurface velocity and an initial guess of the velocity.

Another purpose of the present disclosure is not to use the steepest descent method.

Another purpose of the present disclosure is to estimate the difference between an initial velocity model and the medium properties of the medium to be inverted, by using the Lippmann-Schwinger equation.

In one general aspect, a seismic imaging apparatus for performing iterative application of direct waveform inversion to image a subsurface structure of an area to be measured includes: a waveform inverter to update a reference velocity model while changing a frequency band in a set order, by using parameter perturbation that is obtained from a virtual scattering source and an updated reference wavefield, wherein the reference velocity model updated in a previous frequency band is set as the reference velocity model of a next frequency band, which is then updated; and a subsurface structure imager to image a subsurface structure by using the updated reference velocity model.

The waveform inverter may set again the reference velocity model, updated in a last frequency band, as the reference velocity model of a first frequency band so as to set a velocity model, updated in the set order in a previous frequency band, as the reference velocity model of a next frequency band, which is then updated.

The waveform inverter may, in response to a frequency being a complex number, change the frequency band while changing, in the set order, each of a damping coefficient, which adjusts an imaginary part, and a size of a real part.

The set order may be an ascending, descending order, or any random order.

The waveform inverter may include: a reference wavefield calculator to calculate a reference wavefield that is a solution of a wavefield equation by using data collected from at least one of a source and receivers; a virtual scattering source obtainer to obtain the virtual scattering source from data residual, which is the difference between actual and reference wavefields; a scattered wavefield calculator to calculate a scattered wavefield from the virtual scattering source; a reference wavefield reconstructor to reconstruct the reference wavefield by summing up the reference wavefield and the scattered wavefield; a parameter perturbation obtainer to obtain the parameter perturbation from the virtual scattering source and the reconstructed reference wavefield; and a reference velocity model updator to update the reference velocity model by using data, collected from at least one of the source and receivers, and through the obtained parameter perturbation.

The reference wavefield calculator may calculate the reference wavefield from a wave equation of a frequency domain, which is transformed from the wave equation of a time domain through Fourier transform, by using a finite element method or a finite difference method.

The virtual scattering source obtainer may obtain the virtual scattering source from an equation that is yielded from Lippmann-Schwinger equation by using the data residual and Green's function.

The parameter perturbation obtainer may obtain the parameter perturbation by applying a Newton's method or a least-squares method to an objective function.

Other features and aspects may be apparent from the following detailed description, the drawings, and the claims.

BRIEF DESCRIPTION OF THE DRAWINGS

FIG. 7 is a diagram illustrating (a) that shows a shot-gather seismogram, and (b) that shows a frequency spectrum of the Marmousi data set.

FIG. 17 is a diagram illustrating shot-gather seismograms of the noise-contaminated Marmousi data set with signal-to-noise (S/N) ratio of (a) 12.75 and (b) 25.50.

Figure 1:
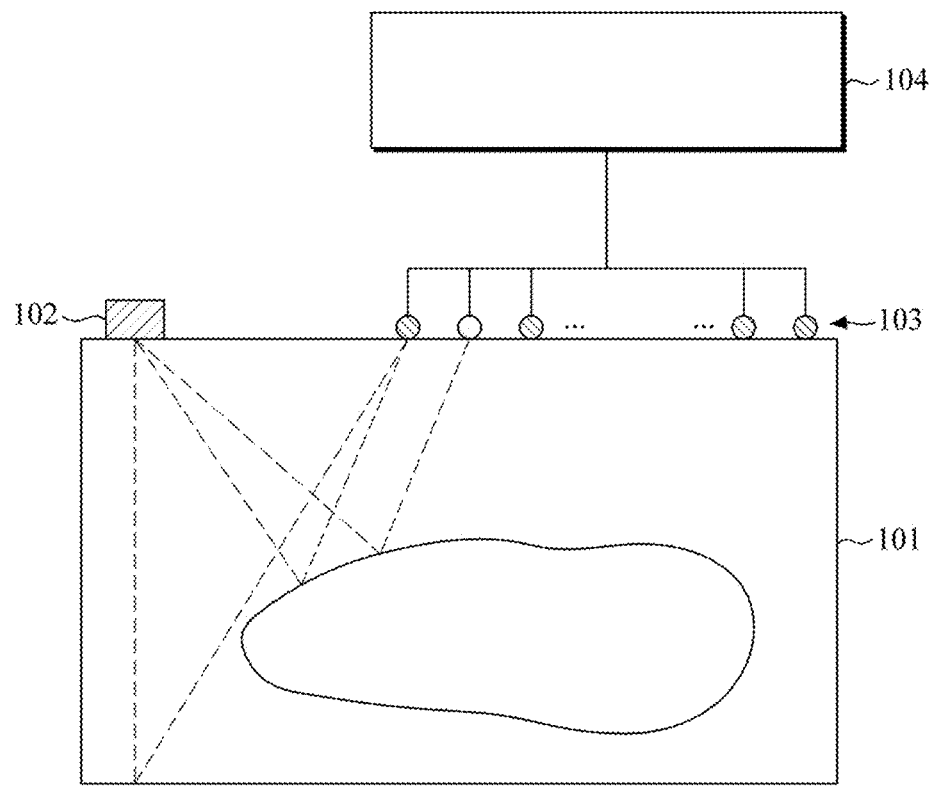
FIG. 1 is an exemplary diagram illustrating a constitution of a seismic imaging apparatus for performing the iterative application of direct waveform inversion according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Descriptions incorporated herein is omitted to enhance clarity and conciseness, and similar reference numerals are used to refer to similar elements, features, and structures throughout the drawings and the detailed description. The description that one portion 'comprises' one element does not indicate that other elements are excluded, but it indicates other elements are further included if there are not the descriptions against the present disclosure. In addition, the components, devices, and units described herein indicate "a block configured to enable the systems of hardware or software to be changed or plugged in", which is, in other words, one unit or block that performs functions in hardware or software.

FIG. 1 is an exemplary diagram illustrating a constitution of a seismic imaging apparatus for performing the iterative application of direct waveform inversion according to an exemplary embodiment.

Referring to FIG. 1, a subsurface structure imaging apparatus may include a source 102, receivers 103, and a signal processor 104, which are installed in an area 101 to be measured. The source 102 generates sound waves or oscillating waves. The generated sound waves or oscillating waves are delivered to the area 101. The receivers 103 measure the sound waves or oscillating waves, which are generated by the source 102, at each point of the area 101. The properties of the sound waves or oscillating waves that each of the receivers 103 measures may be different according to the subsurface structure of the area 101.

The signal processor 104 generates image data regarding the area 101 by processing the sound waves or oscillating waves measured by the receiver 103. To generate the image data, the signal processor 104 may generate a velocity model regarding the area 101. The velocity model may indicate the velocity distribution of seismic waves regarding the area 101. For example, the velocity of seismic waves inside the area 101 may be different according to the properties of each point inside the area 101, wherein the properties are, for example, types or density, etc., of media. When the velocity model indicating the velocity distribution of seismic waves is acquired, the subsurface structure of the area 101 may be imaged from the velocity model.

The signal processor 104 is capable of generating a velocity model through waveform inversion. The waveform inversion indicates making an initial velocity model regarding an area of interest and iteratively updating the initial velocity model by using the measurement value that is acquired at the same area of interest. In other words, the initial velocity model is set as the reference velocity model, which is then updated. The velocity model having properties that are similar to the actual properties of the area of interest may be acquired through the iterative updates of the above-mentioned velocity model.

For example, the signal processor 104 sets the velocity model of the area 101, acquires seismic data from the area 101, and iteratively updates the set velocity model by using the acquired seismic data so as to acquire a velocity model that is similar to the velocity distribution of the actual seismic waves of the area 101.

Figure 2:
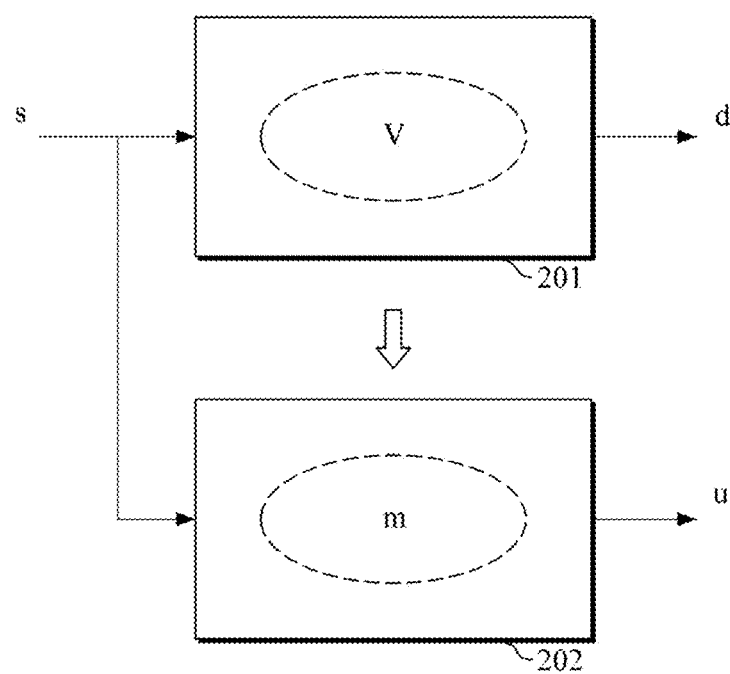
FIG. 2 is a diagram illustrating a theory of waveform inversion according to an exemplary embodiment.

FIG. 2 is a diagram illustrating a theory of waveform inversion according to an exemplary embodiment.

Referring to FIG. 2, an area to be measured 201 has properties V. These properties V may indicate various properties, such as the velocity, density, or temperature of seismic waves regarding each part of the area 201. If any input S is applied to the area 201, output d may be acquired according to the properties V. Here, the output d depends on the input S and the properties V. For example, even though the same input S is given, if the properties V of the area 201 are changed, the output d may be also changed.

If it is assumed that the properties V are the velocity properties of the area 201, the area 201 may be modeled into parameter m regarding the velocity. Because the parameter m regarding the velocity is iteratively updated afterwards, it may be set to have all uniform velocity distribution at first. If the velocity parameter m is set, the output u of the time when virtual input S is applied to an area 202 to be measured may be acquired, wherein the area 202 is modeled. In other words, the output u corresponds to output d so that if the velocity parameter m is set the same as the actual properties V, the output u may have the same value as the output d. If the velocity parameter m is set so that the output u is the same as the output d, it is possible that the parameter m is acquired the same as the actual properties V.

Through such waveform inversion, a subsurface structure imaging apparatus according to an exemplary embodiment may acquire the measurement data d and the modelling data u; estimate the properties V regarding an area to be measured by adjusting the velocity parameter m to minimize the difference between the measurement data d and the modelling data u; and generate the velocity model and image data by using the acquired velocity parameter m or the estimated properties V.

Figure 3:
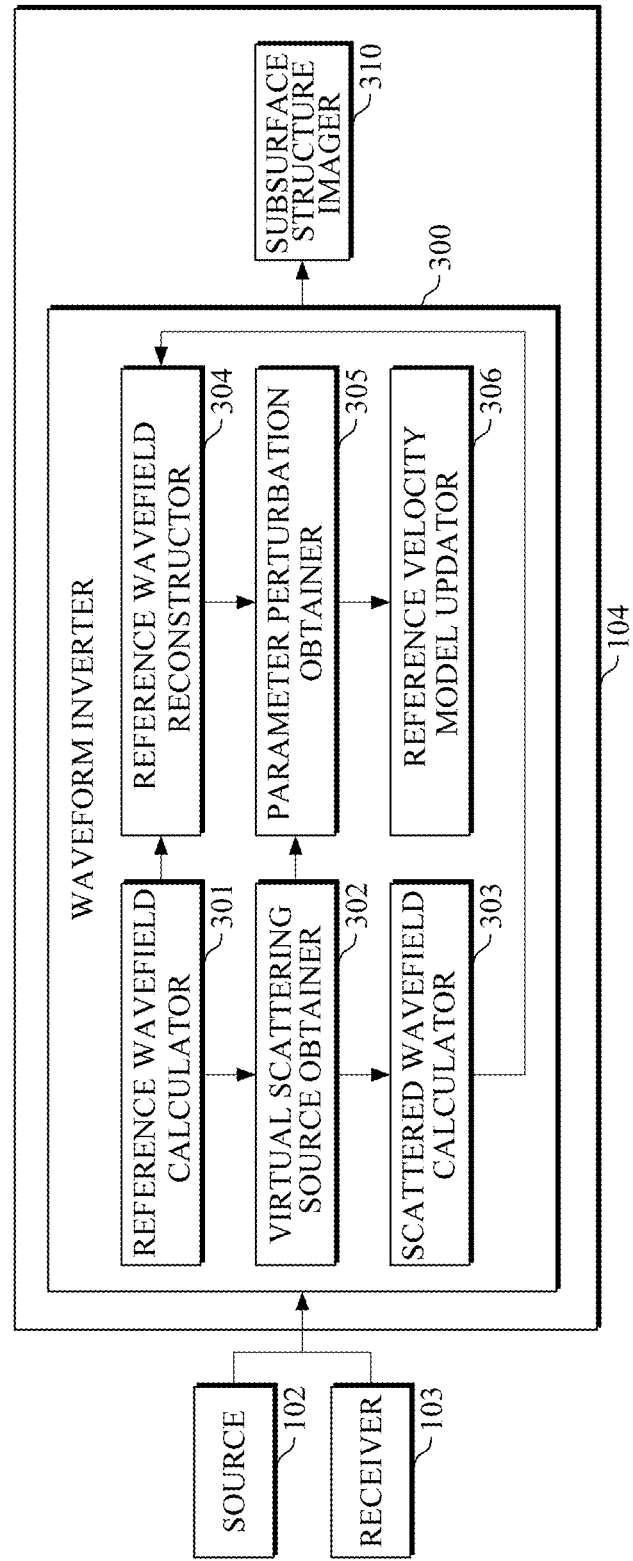
FIG. 3 is a diagram illustrating a detailed constitution of a seismic imaging apparatus for performing the iterative application of direct waveform inversion according to an exemplary embodiment.

FIG. 3 is an exemplary diagram illustrating a detailed constitution of a seismic imaging apparatus for performing the iterative application of direct waveform inversion according to an exemplary embodiment.

According to one aspect of the present invention, a subsurface structure imaging apparatus includes a source 102, receivers 103, and a signal processor 104. The detailed description regarding the source, the receivers, and the signal processor is mentioned above, and the signal processor 104 illustrated in FIG. 1 includes a waveform inverter 300 and a subsurface structure imager 310.

According to one aspect of the present invention, a seismic imaging apparatus for performing the iterative application of direct waveform inversion to image a subsurface structure of an area to be measured may include a waveform inverter 300 and a subsurface structure imager 310.

In one exemplary embodiment, the subsurface imager 310 images the subsurface structure by using the updated reference velocity model. The subsurface imager 310 outputs the signal transmitted from the waveform inverter 300. The subsurface imager 310 is a display to output the data processed in the form, such as an image or graph.

In one exemplary embodiment, the waveform inverter 300 updates a reference velocity model while changing the frequency band in the set order, by using the parameter perturbation that is obtained from a virtual scattering source and the updated reference wavefield, wherein the reference velocity model updated in the previous frequency band is set as the reference velocity model of the next frequency band, which is then updated.

The process of updating the reference velocity model by using the parameter perturbation, calculated from the virtual scattering source and the reconstructed reference wavefield, will be described later.

The waveform inverter 300 may generate an initial velocity model regarding an area of interest and iteratively update the initial velocity model by using the measurement value acquired from the same area of interest. In other words, since the initial velocity model is set as the reference velocity model, which is then updated, both the initial velocity model and the reference velocity model may be the same.

In one exemplary embodiment, the waveform inverter 300 may set again the reference velocity model, updated in the last frequency band, as the reference velocity model of the first frequency band so as to set the velocity model, updated in the set order in the previous frequency band, as the reference velocity model of the next frequency band, which is then updated. After the velocity model regarding the first frequency band is updated, the waveform inverter 300 may set again the velocity model, which is updated while the frequency band is changed to the last frequency band, as the reference velocity model of the first frequency band so as to perform the inversion and acquire the final velocity model that is similar to the actual medium. For example, in the case in which the velocity model is updated in the ascending order of the frequency, the waveform inverter 300 updates the velocity model in the highest frequency band, which is the last frequency band, and sets again the updated velocity model as the reference velocity model of the lowest frequency band so that the velocity model is updated. The waveform inverter 300 may perform, more than once, the frequency strategy of updating the velocity model while the frequency band is changed to the higher frequency band after the velocity model regarding the lowest frequency band is updated.

The abovementioned updates of the velocity model are not limited to the update according to such an ascending order of frequency, but the velocity model may be also updated in a descending order or in any random order.

In one exemplary embodiment, if a frequency is a complex number, the waveform inverter 300 changes the frequency band while changing, in the set order, each of the damping coefficient, which adjusts an imaginary part, and the size of a real part. As the frequency f of the unit of Hertz is expressed in an angular frequency $\omega$ (omega) of the unit of rad/s, if there is no damping, the following equation is obtained: $\omega = 2*pi*f$, where pi denotes 3.14159, i.e., the ratio of a circle's circumference to its diameter. In the case of a complex angular frequency including the damping, the following equation is obtained: $\omega = 2*pi*f + i*alpha$, where i denotes the square root of (−1) that is the unit complex number and alpha denotes a damping coefficient indicating the intensity of the damping. In other words, the frequency is the real, imaginary, or complex number, and the waveform inverter 300 updates a velocity model while changing a frequency band in any one form of the real, imaginary, and complex numbers. If the frequency is a complex number, the waveform inverter 300 changes the frequency band while changing each of the damping coefficient and f in the set order, wherein the damping coefficient is expressed as 'alpha' and f indicates the size of the real part; and updates the velocity model.

In one exemplary embodiment, the set order is an ascending, descending order, or any random order. If the damping coefficient is 0, i.e., the frequency is the real number, the velocity model is updated while only the size of the real part is changed in the set order.

In the case in which the velocity model is updated in the ascending order of the size of the real part, the waveform inverter 300 may perform, more than once, the frequency strategy of updating the velocity model while the frequency band is changed from the lower frequency band to the higher frequency band after the velocity model regarding the lowest frequency band is updated. The waveform inverter 300 updates the velocity model regarding the lowest frequency band and then sets the updated velocity model as an initial velocity model regarding the secondly lowest frequency band so as to update the initial velocity model. The initial velocity model is a reference velocity model.

If a selected frequency domain is, for example, 4 to 15 Hz and its interval is 0.2 Hz, the velocity model is updated in the order of 4.0 Hz, 4.2 Hz, 4.4 Hz, . . . , and 15 Hz.

The method of updating the velocity model is not limited to the above-mentioned ascending order; and the velocity model, updated in the previous frequency band, is set as an initial velocity model of the next frequency band so that the velocity model may also be updated in the descending order of frequency or in any random order. Such a repeated calculation is performed until the velocity model is updated in the last frequency band.

The case in which the damping coefficient is not 0 is as follows:

In the case in which the damping coefficient is changed at intervals of 0.2 within the range of 0.2 to 1.0 in the ascending order, and the real part is changed at intervals of 0.2 Hz within the range of 4 Hz to 15 Hz in the ascending order, the frequency band is changed in the order of (4.0 Hz, 0.2), (4.0 Hz, 0.4), (4.0 Hz, 0.6), (4.0 Hz, 0.8), (4.0 Hz, 1.0), (4.2 Hz, 0.2), (4.2 Hz, 0.4), (4.2 Hz, 0.6), (4.2 Hz, 0.8), (4.2 Hz, 1.0), . . . , (15 Hz, 0.2), (15 Hz, 0.4), (15 Hz, 0.6), (15 Hz, 0.8), and (15 Hz, 1.0), and the velocity model is updated in each of the frequency bands.

The damping coefficient and the size of the real part are in the same interval and the same range as mentioned above. In the following example, the damping coefficient is changed in the descending order, and the size of the real part is changed in the ascending order.

The frequency band is changed in the order of (4.0 Hz, 1.0), (4.0 Hz, 0.8), (4.0 Hz, 0.6), (4.0 Hz, 0.4), (4.0 Hz, 0.2), (4.2 Hz, 1.0), (4.2 Hz, 0.8), (4.2 Hz, 0.6), (4.2 Hz, 0.4), (4.2 Hz, 0.2), . . . , (15 Hz, 1.0), (15 Hz, 0.8), (15 Hz, 0.6), (15 Hz, 0.4), and (15 Hz, 0.2), and the velocity model is updated in each of the frequency bands.

The damping coefficient and the size of the real part are in the same interval and the same range as mentioned above. In the following example, the damping coefficient is changed in the descending order, and the size of the real part is also changed in the descending order.

The frequency band is changed in the order of (15 Hz, 1.0), (15 Hz, 0.8), (15 Hz, 0.6), (15 Hz, 0.4), (15 Hz, 0.2), . . . , (4.2 Hz, 1.0), (4.2 Hz, 0.8), (4.2 Hz, 0.6), (4.2 Hz, 0.4), (4.2 Hz, 0.2), (4.0 Hz, 1.0), (4.0 Hz, 0.8), (4.0 Hz, 0.6), (4.0 Hz, 0.4), and (4.0 Hz, 0.2), and the velocity model is updated in each of the frequency bands.

The damping coefficient and the size of the real part are in the same interval and the same range as mentioned above. In the following example, the damping coefficient is changed in the descending order, each of which is repeated twice, and the size of the real part is also changed in the descending order.

The frequency band is changed in the order of (15 Hz, 1.0), (15 Hz, 1.0), (15 Hz, 0.8), (15 Hz, 0.8), . . . , (4.2 Hz, 0.4), (4.2 Hz, 0.4), (4.2 Hz, 0.2), (4.2 Hz, 0.2), (4.0 Hz, 1.0), (4.0 Hz, 1.0), (4.0 Hz, 0.8), (4.0 Hz, 0.8), (4.0 Hz, 0.6), (4.0 Hz, 0.6), (4.0 Hz, 0.4), (4.0 Hz, 0.4), and (4.0 Hz, 0.2), (4.0 Hz, 0.2), and the velocity model is updated in each of the frequency bands.

The method of changing the frequency band is not limited to the above-mentioned example; and the size of the real part of the frequency and the damping coefficient may be set at various intervals and within various ranges. Also, the set order that is mentioned above is not limited to the descending and ascending orders, but it may be any random order.

According to one aspect of the present invention, a waveform inverter 300 may include a reference wavefield calculator 301, a virtual scattering source obtainer 302, a scattered wavefield calculator 303, a reference wavefield reconstructor 304, a parameter perturbation obtainer 305, and a reference velocity model updator 306.

In one exemplary embodiment, the reference wavefield calculator 301 calculates a reference wavefield that is the solution of a wavefield equation by using data collected from at least one of the source and receivers. The collected data may, for example, include the p-wave velocity, wavefield, source functions, etc.

In one exemplary embodiment, the reference wavefield calculator 301 calculates the reference wavefield from a wave equation of a frequency domain, which is transformed from the wave equation of a time domain through the Fourier transform, by using a finite element method or a finite difference method. The process, in which the reference wavefield calculator 301 calculates the reference wavefield, is as follows:

An acoustic approximation of the 2-D wave equation can be given in the time domain as follows:

$$\frac{1}{v^2}\frac{\partial^2 u}{\partial t^2} = \frac{\partial^2 u}{\partial x^2} + \frac{\partial^2 u}{\partial z^2} + f, \quad (1)$$

In Equation 1, v=v(x, z) is the P-wave velocity, u=u(x, z, t) is the wavefield and f=f(t) is the source function in the time domain.

The Fourier transform of Equation 1 yields Equation 2, i.e., the wave equation, in the frequency domain as follows:

$$-\frac{\omega^2}{v^2}\tilde{u} = \frac{\partial^2 \tilde{u}}{\partial x^2} + \frac{\partial^2 \tilde{u}}{\partial z^2} + \tilde{f}, \quad (2)$$

In Equation 2, $\omega$ is the temporal angular frequency, $\tilde{u}=\tilde{u}(x, z, \omega)$ is the wavefield in the frequency domain, and $\tilde{f}=\tilde{f}(\omega)$ is the source wavelet function in the frequency domain. The forward modelling of this wave propagation simulation is based on numerical solutions of the wave equation using spatial approximations, such as finite-difference or finite-element methods.

The Equation 2 may be rewritten as follows using the finite-difference method in the spatial domain:

$$-\frac{\omega^2}{v_{x,z}^2}\tilde{u}_{x,z} = \frac{\tilde{u}_{x+\Delta x,z} - 2\tilde{u}_{x,z} + \tilde{u}_{x-\Delta x,z}}{\Delta x^2} + \frac{\tilde{u}_{x,z+\Delta z} - 2\tilde{u}_{x,z} + \tilde{u}_{x,z-\Delta z}}{\Delta z^2} + \tilde{f}, \quad (3)$$

In Equation 3, $v_{x,z}$ and $\tilde{u}_{x,z}$ denote the velocity and frequency-domain wavefield, respectively, at the gridpoint x, z in the velocity model. $\Delta x=\Delta z=h$ represents the spatial grid spacing in the model. A numerical solution of the wave equation in the frequency domain may be obtained by solving it in matrix form. It is well-known that Equation 2, i.e., the wave equation, in the frequency domain may be represented in the general matrix form as follows:

$$Su=f \quad (4)$$

In Equation 4, S is the complex impedance matrix of the velocity model, u is the wavefield vector, and f is the source vector in the frequency domain.

$$S = \begin{bmatrix} \left(-\frac{\omega^2}{v_1^2} + \frac{4}{h^2}\right) & -\frac{1}{h^2} & & -\frac{1}{h^2} & & & \\ -\frac{1}{h^2} & \left(-\frac{\omega^2}{v_2^2} + \frac{4}{h^2}\right) & -\frac{1}{h^2} & & -\frac{1}{h^2} & & \\ & \ddots & \ddots & \ddots & \ddots & \ddots & \\ & -\frac{1}{h^2} & & -\frac{1}{h^2} & \left(-\frac{\omega^2}{v_k^2} + \frac{4}{h^2}\right) & -\frac{1}{h^2} & -\frac{1}{h^2} \\ & & \ddots & \ddots & \ddots & \ddots & \ddots \\ & & & & -\frac{1}{h^2} & -\frac{1}{h^2} & \left(-\frac{\omega^2}{v_m^2} + \frac{4}{h^2}\right) \end{bmatrix} \quad (5)$$

$$u = [\tilde{u}_1 \ \tilde{u}_2 \ \ldots \ \tilde{u}_k \ \ldots \ \tilde{u}_m]^T \quad (6)$$

$$f = [\tilde{f}_1 \ \tilde{f}_2 \ \ldots \ \tilde{f}_k \ \ldots \ \tilde{f}_m]^T \quad (7)$$

The complex impedance matrix, S, is an m×m band matrix with five diagonal bands, where m is the number of gridpoints in the velocity model. By assuming that the matrices S and $S_0$ are, respectively, the complex impedance matrices of the actual and reference velocity models for the waveform inversion, the matrix S may be taken apart into two matrices, $s = s_0 + \Delta s$.

$$S_0 = \begin{bmatrix} \left(-\frac{\omega^2}{v_{1,ref}^2} + \frac{4}{h^2}\right) & -\frac{1}{h^2} & & -\frac{1}{h^2} & & & \\ -\frac{1}{h^2} & \left(-\frac{\omega^2}{v_{2,ref}^2} + \frac{4}{h^2}\right) & -\frac{1}{h^2} & & -\frac{1}{h^2} & & \\ & \ddots & \ddots & \ddots & \ddots & \ddots & \\ & -\frac{1}{h^2} & & -\frac{1}{h^2} & \left(-\frac{\omega^2}{v_{k,ref}^2} + \frac{4}{h^2}\right) & -\frac{1}{h^2} & -\frac{1}{h^2} \\ & & \ddots & \ddots & \ddots & \ddots & \ddots \\ & & & & -\frac{1}{h^2} & -\frac{1}{h^2} & \left(-\frac{\omega^2}{v_{m,ref}^2} + \frac{4}{h^2}\right) \end{bmatrix} \quad (8)$$

$$\Delta S = \begin{bmatrix} \Delta s_1 & & & & \\ & \Delta s_2 & & & \\ & & \ddots & & \\ & & & \Delta s_k & \\ & & & & \ddots \\ & & & & & \Delta s_m \end{bmatrix}, \text{ where } \Delta s_k = -\omega^2 \left(\frac{1}{v_k^2} - \frac{1}{v_{k,ref}^2}\right). \quad (9)$$

$\Delta s_k$ is the diagonal element of impedance difference matrix $\Delta S$; and $v_k$ and $v_{k,ref}$ are the P-wave velocities of the k-th gridpoint in the actual and reference velocity models, respectively. The diagonal element, $\Delta S$, is proportional to the parameter ($=1/v^2$) difference between the velocities of the actual and reference medium.

The main objective of direct waveform inversion is to directly obtain the parameter perturbation between the actual and reference velocity models. The wavefield $u_0$ for the reference velocity model is determined by solving the following wave equation 10 in matrix form:

$$S_0 u_0 = f \quad (10)$$

In Equation 10, $u_0$ is the reference wavefield vector for the reference velocity model when the source vector is equivalent to that in Equation 4.

In one exemplary embodiment, the scattered wavefield calculator 303 calculates a scattered wavefield from the virtual scattering source. The scattered wavefield is represented as the difference between the actual and reference wavefields as follows: $\Delta u = u - u_0$.

Subtracting Equation 10 from Equation 4 may yield the following equation:

$$\Delta S(u_0 + \Delta u) = -S_0 \Delta u \quad (11)$$

In Equation 11, $\Delta S$ is an unknown matrix that can be obtained through a direct waveform inversion. The wavefield difference, $\Delta u$, is also an unknown vector because the wavefield can be obtained only at the receiver positions from the field exploration. The concept of virtual scattering source is introduced to obtain the scattered wavefield, $\Delta u$, based on the Lippmann Schwinger equation with single scattering assumption. In Equation 11, the virtual scattering source is described as follows:

$$S_0 \Delta u = f' \qquad (12)$$

The propagation of the virtual scattering source in the reference velocity model reconstructs the scattered wavefield as the wavefield difference between the actual and reference wavefields.

In one exemplary embodiment, a virtual scattering source obtainer 302 obtains a virtual scattering source from the data residual, which is the difference between the actual and reference wavefields. The virtual scattering source obtainer 302 obtains the virtual scattering source from the equation that is yielded from the Lippmann-Schwinger equation by using the data residual and Green's function.

The virtual scattering source is obtained from the data residual as follows:

$$u(x') - u_0(x') = \int_\Omega G(x';x) f'(x) d\Omega \qquad (13)$$

x' and x denote the receiver nodes and the whole gridpoints, respectively. $u(x')$ and $u_0(x')$ represent the observed field data and modelled data, respectively, which are observed at the receiver nodes. Therefore, the left-hand side of Equation 13 is equivalent to the data residual.

G(x'; x) denotes the Green's function at the receiver nodes, x', when the impulsive source is located at an arbitrary point among the whole gridpoints, x, in the velocity model.

The virtual scattering source, f'(x), is a vector that can reconstruct the scattered wavefield at the whole gridpoints including receiver nodes. Equation 13 comes from the Lippmann-Schwinger equation of scattering theory with single scattering assumption.

In Equation 13, Green's function can be numerically computed from the reference velocity model with single scattering assumption. The inverse of the complex impedance matrix of the reference velocity model, which is $S_0^{-1}$, may be used as the numerical solution of the Green's function. Equation 13 can be represented in Equation 14 as follows using Equation 12:

$$I_{nm} S_0^{-1} f'(x) = I_{nm} \Delta u(x') \qquad (14)$$

In Equation 14, m is the number of whole gridpoints and n is the number of receiver nodes. In Equation 12, $\Delta u(x)$, different from $\Delta u(x')$ in Equation 14, is the wavefield difference between the actual and reference wavefields at the whole gridpoints. However, the observed field data at the receiver positions are only available for the waveform inversion process of real field data set. In Equation 14, $I_{nm}$ is an m×m projection matrix that extracts the values corresponding to the receiver nodes in the whole gridpoints. The projection matrix can be represented as follows:

$$I_{nm} = \begin{bmatrix} I_n & 0 \\ 0 & 0 \end{bmatrix} \qquad (15)$$

In Equation 15, $I_n$ denotes an n×n identity matrix. The projection matrix, $I_{nm}$, depends on the gridpoint indexing, and herein, it is supposed that the first to the n-th gridpoints correspond to the surface receiver nodes for simplicity. The right-hand side of Equation 14, $I_{nm}\Delta u(x') = \Delta u(x')$, is a data residual vector as the difference between the field and modelled data. The least-squares method is introduced to obtain the virtual scattering source vector, f'(x), from Equation 14 and yield the following normal equation, Equation 16:

$$(I_{nm} S_0^{-1})^* (I_{nm} S_0^{-1}) f'(x) = (I_{nm} S_0^{-1})^* \Delta u(x') \qquad (16)$$

In Equation 16, the superscript * denotes the conjugate transpose of the matrix. The matrix $S_0^{-1}$ is a symmetric matrix, that is, $(S_0^{-1})^T = S_0^{-1}$. Equation 16 can be rewritten as follows:

$$\overline{S_0^{-1}} I_{nm} S_0^{-1} f'(x) = \overline{S_0^{-1}} \Delta u(x') \qquad (17)$$

In Equation 17, '−' denotes the complex conjugate of the matrix. Solving Equation 17 provides the virtual scattering source vector f'(x) for each frequency and each shot gather. Because the whole matrix is required to obtain the virtual scattering source through Equation 17, the multifrontal matrix solver and generalized minimal residual (GMRES) routines may be used in the numerical implementation.

In one exemplary embodiment, a reference wavefield reconstructor 304 reconstructs the reference wavefield by summing up the reference wavefield and the scattered wavefield.

The propagation of the virtual scattering source vector in the reference velocity model generates the scattered wavefield at the whole gridpoints. Then, the total wavefield may be reconstructed by summing up the reference wavefield $u_0(x)$ and the scattered wave field $\Delta u(x)$. The total wavefield is the reconstructed reference wavefield. The reconstructed wavefield is not equivalent to the actual wavefield that propagates in the actual velocity model because of the single scattering assumption; however, the actual wavefield may be replaced with the reconstructed wavefield. Because the direct waveform inversion employs the parameter perturbation with the single scattering assumption, the inversion result depends on the initial setup of the velocity model as the reference medium.

In one exemplary embodiment, the parameter perturbation obtainer 305 may obtain the parameter perturbation from the virtual scattering source and the reconstructed reference wavefield. The parameter perturbation calculator 305 may obtain the parameter perturbation by applying the Newton's method or the least-squares method to the objective function.

The parameter perturbation, $\Delta s_k$, is obtained from the virtual scattering sources and reconstructed wavefields. The impedance difference matrix between the impedance matrices of the actual and reference velocity models, $\Delta S$, which includes the parameter perturbation in the diagonal elements, may be computed.

$$\Delta s = -\omega^2 \left( \frac{1}{v^2} - \frac{1}{v_{ref}^2} \right)$$

are the diagonal elements, which are proportional to the parameter perturbations between the actual and reference velocity models. Equation 11 may be then rewritten as Equation 18 to obtain the impedance difference matrix $\Delta S$.

$$\Delta S u(x) = -f'(x) \qquad (18)$$

u(x) is the reconstructed wavefield, which is the sum of reference and scattered wavefields. The actual wavefield at the whole gridpoints may be replaced by the reconstructed wavefield at the whole gridpoints. This replacement allows the direct inversion to overcome the limitation of seismic data being only recorded at the receiver positions from the field exploration.

The direct waveform inversion method provides the parameter perturbations through Δs of Equation 18 and updates the reference velocity model. In Equation 18, the impedance difference matrix ΔS is computed from the virtual scattering sources f'(x) and the reconstructed wavefields u(x) for a single frequency with various shot gathers. Because the components of complex number Δs are independent of each other, Equation 18 is a block system which is solved component by component.

The Newton's method of optimization and the least-squares method may be used to minimize the residual between the left- and right-hand sides of Equation 18 across various shot gathers. The objective function is the sum of residuals for various shot gathers because the virtual scattering sources f'(x) and the reconstructed wavefields u(x) are obtained from each of shot gathers. The objective function for Δs is given as follows:

$$E = \frac{1}{2} \sum^{shots} \delta r_k \overline{\delta r_k} \quad (19)$$

The residual $\delta r_k$ is represented as follows:

$$\delta r_k = \Delta s_k u_k + f_k^v \quad (20)$$

In Equation 20, $\Delta s_k$, $u_k$, and $f_k^v$, respectively, denote the elements of ΔS, u and f' corresponding to the k-th gridpoint in the velocity model. Because the direct waveform inversion method is performed in the frequency domain, the variables are complex numbers as follows:

$$\Delta S_k = a + ib \quad (21)$$

$$u_k = c + id \quad (22)$$

$$f_k^v = e + ig \quad (23)$$

In Equations 21, 22, and 23, $\Delta s_k$ is represented as a complex number because it is a diagonal element of the impedance difference matrix ΔS. However, the parameter perturbation may be a real number because it corresponds to the difference between the actual and reference velocities. Therefore, only the real part of Δs may be required to update the reference velocity model. By applying the Newton's method or the least-squares method to Equation 19, the following equation, Equation 24, to update the parameter perturbation at the k-th gridpoint in the velocity model as a complex number may be obtained:

$$(\Delta s_k)_{n+1} = (\Delta s_k)_n - H^{-1} \nabla E \quad (24)$$

In Equation 24, the Hessian matrix H is as follows:

$$H = \begin{bmatrix} \frac{\partial^2 D}{\partial a^2} & \frac{\partial^2 E}{\partial a \partial b} \\ \frac{\partial^2 E}{\partial b \partial a} & \frac{\partial^2 E}{\partial b^2} \end{bmatrix}, \quad (25)$$

The gradient vector ∇E is as follows:

$$\nabla E = \begin{bmatrix} \frac{\partial E}{\partial a} & \frac{\partial E}{\partial b} \end{bmatrix}^T \quad (26)$$

Therefore, Equation 24 may be rewritten as follows:

$$\begin{bmatrix} a_{n+1} \\ b_{n+1} \end{bmatrix} = \begin{bmatrix} a_n \\ b_n \end{bmatrix} - \frac{1}{\sum(c^2 + d^2)} \begin{bmatrix} \sum\{a_n(c^2 + d^2) + (ce + dg)\} \\ \sum\{b_n(c^2 + d^2) + (cg - de)\} \end{bmatrix} \quad (27)$$

Because $a_n$ and $b_n$ on the right-hand side of Equation 27 goes to 0, the resultant equation is composed of only c, d, e, and g on the right-hand side. $\Delta s_k$ may be represented as a complex number using $f_k^v$ and $u_k$.

$$\Delta s_k = \frac{\sum\{(ce + dg) + i(cg - de)\}}{\sum(c^2 + d^2)} = -\frac{\sum(f_k^v \overline{u_k})}{\sum(u_k \overline{u_k})} \quad (28)$$

The reference velocity model may be updated after the diagonal elements of the impedance difference matrix, Δs, are obtained from Equation 28. Because the parameter perturbation is a real number, only the real part of $\Delta s_k$ is employed to update the reference velocity.

In one exemplary embodiment, the reference velocity model updator 306 may update the reference velocity model by using data, collected from at least one of the source and receivers, and through the obtained parameter perturbation.

The following equation, Equation 29, shows how to update the reference velocity model with $\Delta s_k$:

$$\frac{1}{v_k^2} = \frac{1}{v_{k,ref}^2} - \frac{\text{Re}\{\Delta s_k\}}{\omega^2} \quad (29)$$

The proposed direct waveform inversion may, first, formulate the virtual scattering source from the data residual after computing the modelled data in the reference velocity model through Equations 10 and 17. Secondly, the direct waveform inversion may compute the scattered wavefield by propagating the virtual scattering source in the reference velocity model through Equation 12, and reconstruct the total wavefield as the sum of reference and scattered wavefields through Equation 11. Finally, the direct waveform inversion may obtain the parameter perturbation from the virtual scattering sources and reconstructed wavefields through Equation 28 and update the reference velocity model through Equation 29. Equation 29 updates the velocity model by applying the parameter as sloth, i.e., gradient, which is not only the example. As the parameter, various parameters may be used, such as the square of velocity, the inverse of velocity, etc.

Figure 4:
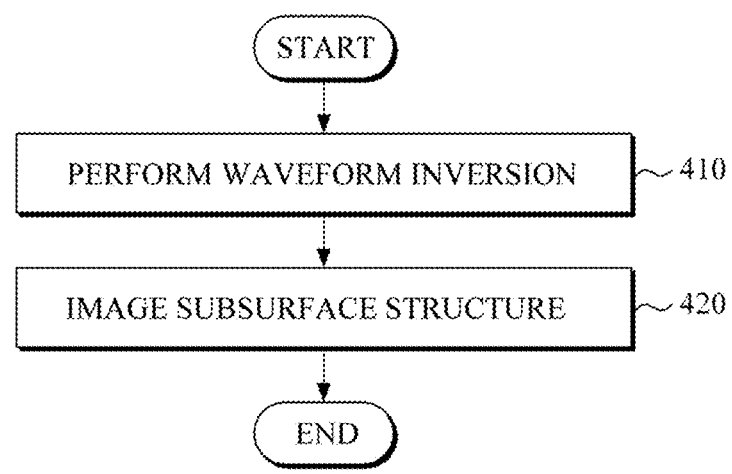
FIG. 4 is a flowchart illustrating a seismic imaging method of performing the iterative application of direct waveform inversion according to an exemplary embodiment.

FIG. 4 is a flowchart illustrating a seismic imaging method of performing the iterative application of direct waveform inversion according to an exemplary embodiment.

According to one aspect of the present invention, a seismic imaging method of performing to the iterative application of direct waveform inversion to image a subsurface structure of an area to be measured may include performing waveform inversion in 410 and imaging a subsurface structure in 420

Operation 420 includes imaging the subsurface structure by using the updated reference velocity model. In 420, the signal, transmitted from the waveform inverter 300, is output. Also, in 420, a display may output the data processed in the form, such as an image or graph.

In one exemplary embodiment, operation 410 of performing waveform inversion includes operations 411 and 416 of updating a reference velocity model while the frequency band is changed in the set order, by using the parameter perturbation that is obtained from a virtual scattering source and the updated reference wavefield, wherein the reference velocity model updated in the previous frequency band is set as the reference velocity model of the next frequency band, which is then updated. Operations 411 and 416 will be described later.

Operation 410 may include generating an initial velocity model regarding an area of interest and iteratively updating the initial velocity model by using the measurement value acquired from the same area of interest. In other words, since the initial velocity model is set as the reference velocity model, which is then updated, both the initial velocity model and the reference velocity model may be the same.

In one exemplary embodiment, operation 410 may include setting again the reference velocity model, updated in the last frequency band, as the reference velocity model of the first frequency band so as to set the velocity model, updated in the set order in the previous frequency band, as the reference velocity model of the next frequency band, which is then updated. After the velocity model regarding the first frequency band is updated, the velocity model, which is updated while the frequency band is changed to the last frequency band, may be set again as the reference velocity model of the first frequency band in 417, 418, and 419 so as to perform the inversion and acquire the final velocity model that is similar to the actual medium. For example, in the case in which the velocity model is updated in the ascending order of the frequency, operation 410 includes operations 418 and 419 of updating the velocity model in the highest frequency band, which is the last frequency band, and setting again the updated velocity model as the reference velocity model of the lowest frequency band so that the velocity model is updated. The frequency strategy may be performed more than once, which is to update the velocity model while the frequency band is changed to the higher frequency band after the velocity model regarding the lowest frequency band is updated.

The abovementioned updates of the velocity model are not limited to the update according to such an ascending order of frequency, but the velocity model may be also updated in a descending order or in any random order.

In one exemplary embodiment, if a frequency is a complex number, operation 410 includes changing the frequency band while changing, in the set order, each of the damping coefficient, which adjusts an imaginary part, and the size of a real part. As the frequency f of the unit of Hertz is expressed in an angular frequency ω (omega) of the unit of rad/s, if there is no damping, the following equation is obtained: $\omega = 2*pi*f$, where pi denotes 3.14159, i.e., the ratio of a circle's circumference to its diameter. In the case of a complex angular frequency including the damping, the following equation is obtained: $\omega = 2*pi*f + i*alpha$, where i denotes the square root of $(-1)$ that is the unit complex number and alpha denotes a damping coefficient indicating the intensity of the damping. In other words, the frequency is the real, imaginary, or complex number, and the waveform inverter 300 updates a velocity model while changing a frequency band in any one form of the real, imaginary, and complex numbers. If the frequency is a complex number, the waveform inverter 300 changes the frequency band while changing each of the damping coefficient and f in the set order, wherein the damping coefficient is expressed as 'alpha' and f indicates the size of the real part; and updates the velocity model.

In one exemplary embodiment, the set order is an ascending, descending order, or any random order. If the damping coefficient is 0, i.e., the frequency is the real number, the velocity model is updated while only the size of the real part is changed in the set order.

In the case in which the velocity model is updated in the ascending order of the size of the real part, operation 410 includes performing, more than once, the frequency strategy of updating the velocity model while the frequency band is changed from the lower frequency band to the higher frequency band after the velocity model regarding the lowest frequency band is updated. Operation 410 includes updating the velocity model regarding the lowest frequency band and then setting the updated velocity model as an initial velocity model regarding the secondly lowest frequency band so as to update the initial velocity model.

If a selected frequency domain is, for example, 4 to 15 Hz and its interval is 0.2 Hz, the velocity model is updated in the order of 4.0 Hz, 4.2 Hz, 4.4 Hz, . . . , and 15 Hz.

The method of updating the velocity model is not limited to the above-mentioned ascending order; and the velocity model, updated in the previous frequency band, is set as an initial velocity model of the next frequency band so that the velocity model may also be updated in the descending order of frequency or in any random order. Such a repeated calculation is performed until the velocity model is updated in the last frequency band.

The case in which the damping coefficient is not 0 is as follows:

In the case in which the damping coefficient is changed at intervals of 0.2 within the range of 0.2 to 1.0 in the ascending order, and the real part is changed at intervals of 0.2 Hz within the range of 4 Hz to 15 Hz in the ascending order, the frequency band is changed in the order of (4.0 Hz, 0.2), (4.0 Hz, 0.4), (4.0 Hz, 0.6), (4.0 Hz, 0.8), (4.0 Hz, 1.0), (4.2 Hz, 0.2), (4.2 Hz, 0.4), (4.2 Hz, 0.6), (4.2 Hz, 0.8), (4.2 Hz, 1.0), . . . , (15 Hz, 0.2), (15 Hz, 0.4), (15 Hz, 0.6), (15 Hz, 0.8), and (15 Hz, 1.0), and the velocity model is updated in each of the frequency bands.

The damping coefficient and the size of the real part are in the same interval and the same range as mentioned above. In the following example, the damping coefficient is changed in the descending order, and the size of the real part is changed in the ascending order.

The frequency band is changed in the order of (4.0 Hz, 1.0), (4.0 Hz, 0.8), (4.0 Hz, 0.6), (4.0 Hz, 0.4), (4.0 Hz, 0.2), (4.2 Hz, 1.0), (4.2 Hz, 0.8), (4.2 Hz, 0.6), (4.2 Hz, 0.4), (4.2 Hz, 0.2), . . . , (15 Hz, 1.0), (15 Hz, 0.8), (15 Hz, 0.6), (15 Hz, 0.4), and (15 Hz, 0.2), and the velocity model is updated in each of the frequency bands.

The damping coefficient and the size of the real part are in the same interval and the same range as mentioned above. In the following example, the damping coefficient is changed in the descending order, and the size of the real part is also changed in the descending order.

The frequency band is changed in the order of (15 Hz, 1.0), (15 Hz, 0.8), (15 Hz, 0.6), (15 Hz, 0.4), (15 Hz, 0.2), . . . , (4.2 Hz, 1.0), (4.2 Hz, 0.8), (4.2 Hz, 0.6), (4.2 Hz, 0.4), (4.2 Hz, 0.2), (4.0 Hz, 1.0), (4.0 Hz, 0.8), (4.0 Hz, 0.6), (4.0 Hz, 0.4), and (4.0 Hz, 0.2), and the velocity model is updated in each of the frequency bands.

The damping coefficient and the size of the real part are in the same interval and the same range as mentioned above. In the following example, the damping coefficient is changed in the descending order, each of which is repeated twice, and the size of the real part is also changed in the descending order.

The frequency band is changed in the order of (15 Hz, 1.0), (15 Hz, 1.0), (15 Hz, 0.8), (15 Hz, 0.8), . . . , (4.2 Hz, 0.4), (4.2 Hz, 0.4), (4.2 Hz, 0.2), (4.2 Hz, 0.2), (4.0 Hz, 1.0), (4.0 Hz, 1.0), (4.0 Hz, 0.8), (4.0 Hz, 0.8), (4.0 Hz, 0.6), (4.0 Hz, 0.6), (4.0 Hz, 0.4), (4.0 Hz, 0.4), and (4.0 Hz, 0.2), (4.0 Hz, 0.2), and the velocity model is updated in each of the frequency bands.

The method of changing the frequency band is not limited to the above-mentioned example; and the size of the real part of the frequency and the damping coefficient may be set at various intervals and within various ranges. Also, the set order that is mentioned above is not limited to the descending and ascending orders, but it may be any random order.

Figure 5:
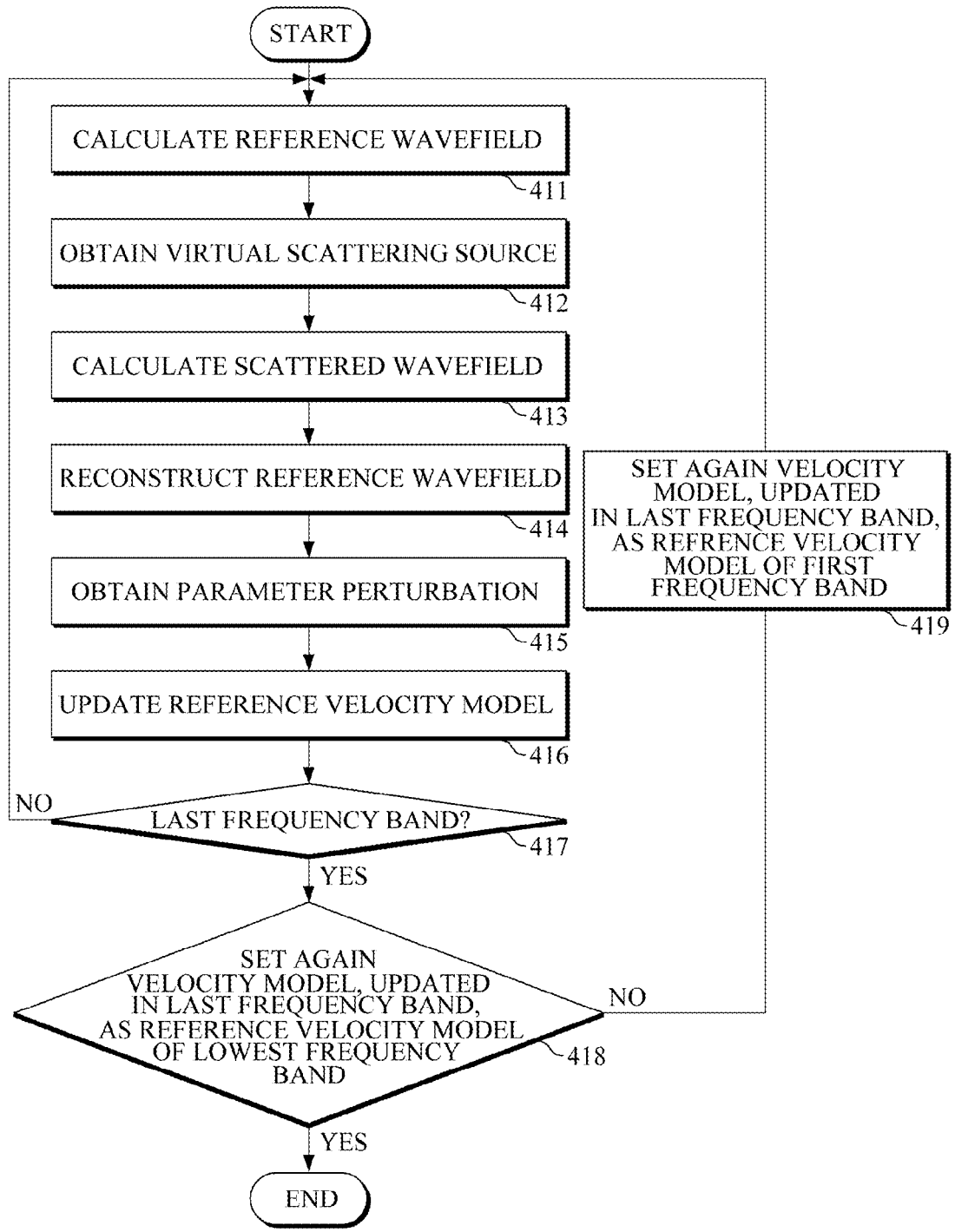
FIG. 5 is a detailed flowchart illustrating an operation of performing waveform inversion according to an exemplary embodiment.

FIG. 5 is a detailed flowchart illustrating an operation 410 of performing waveform inversion according to an exemplary embodiment.

According to one aspect of the present invention, operation 410 may include: calculating a reference wavefield in 411; obtaining a virtual scattering source in 412; calculating a scattered wavefield in 413; reconstructing a reference wavefield in 414; obtaining parameter perturbation in 415; and updating a reference velocity model in 416.

In one exemplary embodiment, operation 411 includes calculating a reference wavefield that is the solution of a wavefield equation by using data collected from at least one of the source and receivers. The collected data may, for example, include the p-wave velocity, wavefield, source functions, etc.

In one exemplary embodiment, operation 411 includes calculating the reference wavefield from a wave equation of a frequency domain, which is transformed from the wave equation of a time domain through the Fourier transform, by using a finite element method or a finite difference method. The operation 411 to calculate the reference wavefield is as follows:

An acoustic approximation of the 2-D wave equation can be given in the time domain as follows:

$$\frac{1}{v^2}\frac{\partial^2 u}{\partial t^2} = \frac{\partial^2 u}{\partial x^2} + \frac{\partial^2 u}{\partial z^2} + f. \quad (1)$$

In Equation 1, $v=v(x, z)$ is the P-wave velocity, $u=u(x, z, t)$ is the wavefield and $f=f(t)$ is the source function in the time domain.

The Fourier transform of Equation 1 yields Equation 2, i.e., the wave equation, in the frequency domain as follows:

$$-\frac{\omega^2}{v^2}\tilde{u} = \frac{\partial^2 \tilde{u}}{\partial x^2} + \frac{\partial^2 \tilde{u}}{\partial z^2} + \tilde{f}. \quad (2)$$

In Equation 2, $\omega$ is the temporal angular frequency, $\tilde{u}=\tilde{u}(x, z, \omega)$ is the wavefield in the frequency domain, and $\tilde{f}=\tilde{f}(\omega)$ is the source wavelet function in the frequency domain. The forward modelling of this wave propagation simulation is based on numerical solutions of the wave equation using spatial approximations, such as finite-difference or finite-element methods.

The Equation 2 may be rewritten as follows using the finite-difference method in the spatial domain:

$$-\frac{\omega^2}{v_{x,z}^2}\tilde{u}_{x,z} = \frac{\tilde{u}_{x+\Delta x,z} - 2\tilde{u}_{x,z} + \tilde{u}_{x-\Delta x,z}}{\Delta x^2} + \frac{\tilde{u}_{x,z+\Delta z} - 2\tilde{u}_{x,z} + \tilde{u}_{x,z-\Delta z}}{\Delta z^2} + \tilde{f}, \quad (3)$$

In Equation 3, $v_{x,z}$ and $\tilde{u}_{x,z}$ denote the velocity and frequency-domain wavefield, respectively, at the gridpoint x, z in the velocity model. $\Delta x=\Delta z=h$ represents the spatial grid spacing in the model. A numerical solution of the wave equation in the frequency domain may be obtained by solving it in matrix form. It is well-known that Equation 2, i.e., the wave equation, in the frequency domain may be represented in the general matrix form as follows:

$$Su=f \quad (4)$$

In Equation 4, S is the complex impedance matrix of the velocity model, u is the wavefield vector, and f is the source vector in the frequency domain.

$$S = \begin{bmatrix} \left(-\frac{\omega^2}{v_1^2} + \frac{4}{h^2}\right) & -\frac{1}{h^2} & & -\frac{1}{h^2} & & & \\ -\frac{1}{h^2} & \left(-\frac{\omega^2}{v_2^2} + \frac{4}{h^2}\right) & -\frac{1}{h^2} & & -\frac{1}{h^2} & & \\ & \ddots & \ddots & \ddots & & \ddots & \\ & -\frac{1}{h^2} & & -\frac{1}{h^2} & \left(-\frac{\omega^2}{v_k^2} + \frac{4}{h^2}\right) & -\frac{1}{h^2} & -\frac{1}{h^2} \\ & & \ddots & & \ddots & \ddots & \ddots \\ & & & -\frac{1}{h^2} & & -\frac{1}{h^2} & -\frac{1}{h^2} & \left(-\frac{\omega^2}{v_m^2} + \frac{4}{h^2}\right) \end{bmatrix}, \quad (5)$$

$$u = [\tilde{u}_1 \quad \tilde{u}_2 \quad \ldots \quad \tilde{u}_k \quad \ldots \quad \tilde{u}_m]^T, \quad (6)$$

$$f = [\tilde{f}_1 \quad \tilde{f}_2 \quad \ldots \quad \tilde{f}_k \quad \ldots \quad \tilde{f}_m]^T. \quad (7)$$

The complex impedance matrix, S, is an m×m band matrix with five diagonal bands, where m is the number of gridpoints in the velocity model. By assuming that the matrices S and $S_0$ are, respectively, the complex impedance matrices of the actual and reference velocity models for the waveform inversion, the matrix S may be taken apart into two matrices, $S=S_0+\Delta S$.

$$S_0 = \begin{bmatrix} \left(-\frac{\omega^2}{v_{1,ref}^2}+\frac{4}{h^2}\right) & -\frac{1}{h^2} & & -\frac{1}{h^2} & & & \\ -\frac{1}{h^2} & \left(-\frac{\omega^2}{v_{2,ref}^2}+\frac{4}{h^2}\right) & -\frac{1}{h^2} & & -\frac{1}{h^2} & & \\ & \ddots & \ddots & \ddots & \ddots & \ddots & \\ & -\frac{1}{h^2} & & -\frac{1}{h^2} & \left(-\frac{\omega^2}{v_{k,ref}^2}+\frac{4}{h^2}\right) & -\frac{1}{h^2} & -\frac{1}{h^2} \\ & & \ddots & & \ddots & \ddots & \ddots \\ & & & & -\frac{1}{h^2} & -\frac{1}{h^2} & \left(-\frac{\omega^2}{v_{m,ref}^2}+\frac{4}{h^2}\right) \end{bmatrix} \quad (8)$$

$$\Delta S = \begin{bmatrix} \Delta s_1 & & & & \\ & \Delta s_2 & & & \\ & & \ddots & & \\ & & & \Delta s_k & \\ & & & & \ddots \\ & & & & & \Delta s_m \end{bmatrix}, \text{ where } \Delta s_k = -\omega^2\left(\frac{1}{v_k^2}-\frac{1}{v_{k,ref}^2}\right) \quad (9)$$

$\Delta s_k$ is the diagonal element of impedance difference matrix $\Delta S$; and $v_k$ and $v_{k,ref}$ are the P-wave velocities of the k-th gridpoint in the actual and reference velocity models, respectively. The diagonal element, $\Delta S$, is proportional to the parameter $(=1/v^2)$ difference between the velocities of the actual and reference medium.

The main objective of direct waveform inversion is to directly obtain the parameter perturbation between the actual and reference velocity models. The wavefield $u_0$ for the reference velocity model is determined by solving the following wave equation 10 in matrix form:

$$S_0 u_0 = f \quad (10)$$

In Equation 10, $u_0$ is the reference wavefield vector for the reference velocity model when the source vector is equivalent to that in Equation 4.

In one exemplary embodiment, operation 413 of calculating a scattered wavefield includes calculating the scattered wavefield from the virtual scattering source. The scattered wavefield is represented as the difference between the actual and reference wavefields as follows: $\Delta u = u - u_0$.

Subtracting Equation 10 from Equation 4 may yield the following equation:

$$\Delta S(u_0 + \Delta u) = -S_0 \Delta u \quad (11)$$

In Equation 11, $\Delta s$ is an unknown matrix that can be obtained through a direct waveform inversion. The wavefield difference, $\Delta u$, is also an unknown vector because the wavefield can be obtained only at the receiver positions from the field exploration. The concept of virtual scattering source is introduced to obtain the scattered wavefield, $\Delta u$, based on the Lippmann-Schwinger equation with single scattering assumption. In Equation 11, the virtual scattering source is described as follows:

$$S_0 \Delta u = f'' \quad (12)$$

The propagation of the virtual scattering source in the reference velocity model reconstructs the scattered wavefield as the wavefield difference between the actual and reference wavefields.

In one exemplary embodiment, operation 412 includes obtaining a virtual scattering source from the data residual, which is the difference between the actual and reference wavefields. Operation 412 includes obtaining the virtual scattering source from the equation that is yielded to from the Lippmann-Schwinger equation by using the data residual and Green's function.

The virtual scattering source is obtained from the data residual as follows:

$$u(x')-u_0(x')=\int_\Omega G(x';x)f''(x)d\Omega \quad (13)$$

x' and x denote the receiver nodes and the whole gridpoints, respectively. $u(x')$ and $u_0(x')$ represent the observed field data and modelled data, respectively, which are observed at the receiver nodes. Therefore, the left-hand side of Equation 13 is equivalent to the data residual.

G(x'; x) denotes the Green's function at the receiver nodes, x', when the impulsive source is located at an arbitrary point among the whole gridpoints, x, in the velocity model.

The virtual scattering source, f''(x), is a vector that can reconstruct the scattered wavefield at the whole gridpoints including receiver nodes. Equation 13 comes from the Lippmann-Schwinger equation of scattering theory with single scattering assumption.

In Equation 13, Green's function can be numerically computed from the reference velocity model with single scattering assumption. The inverse of the complex impedance matrix of the reference velocity model, which is $S_0^{-1}$, may be used as the numerical solution of the Green's function. Equation 13 can be represented in Equation 14 as follows using Equation 12:

$$I_{nm}S_0^{-1}f''(x)=I_{nm}\Delta u(x'), \quad (14)$$

In Equation 14, m is the number of whole gridpoints and n is the number of receiver nodes. In Equation 12, $\Delta u(x)$, different from $\Delta u(x')$ in Equation 14, is the wavefield difference between the actual and reference wavefields at the whole gridpoints. However, the observed field data at the receiver positions are only available for the waveform inversion process of real field data set. In Equation 14, $I_{nm}$ is an m×m projection matrix that extracts the values corresponding to the receiver nodes in the whole gridpoints. The projection matrix can be represented as follows:

$$I_{nm} = \begin{bmatrix} I_n & 0 \\ 0 & 0 \end{bmatrix} \quad (15)$$

In Equation 15, $I_n$ denotes an n×n identity matrix. The projection matrix, $I_{nm}$, depends on the gridpoint indexing, and herein, it is supposed that the first to the n-th gridpoints correspond to the surface receiver nodes for simplicity. The right-hand side of Equation 14, $I_{nm}\Delta u(x') = \Delta u(x')$, is a data residual vector as the difference between the field and modelled data. The least-squares method is introduced to obtain the virtual scattering source vector, f'(x), from Equation 14 and yield the following normal equation, Equation 16:

$$(I_{nm}S_0^{-1})^*(I_{nm}S_0^{-1})f'(x) = (I_{nm}S_0^{-1})^*\Delta u(x') \quad (16)$$

In Equation 16, the superscript * denotes the conjugate transpose of the matrix. The matrix $S_0^{-1}$ is a symmetric matrix, that is, $(S_0^{-1})^T = S_0^{-1}$. Equation 16 can be rewritten as follows:

$$\overline{S_0^{-1}}I_{nm}S_0^{-1}f'(x) = \overline{S_0^{-1}}\Delta u(x') \quad (17)$$

In Equation 17, '-' denotes the complex conjugate of the matrix. Solving Equation 17 provides the virtual scattering source vector f'(x) for each frequency and each shot gather. Because the whole matrix is required to obtain the virtual scattering source through Equation 17, the multifrontal matrix solver and generalized minimal residual (GMRES) routines may be used in the numerical implementation.

In one exemplary embodiment, operation 414 includes reconstructing the reference wavefield by summing up the reference wavefield and the scattered wavefield.

The propagation of the virtual scattering source vector in the reference velocity model generates the scattered wavefield at the whole gridpoints. Then, the total wavefield may be reconstructed by summing up the reference wavefield $u_0(x)$ and the scattered wave field $\Delta u(x)$. The total wavefield is the reconstructed reference wavefield. The reconstructed wavefield is not equivalent to the actual wavefield that propagates in the actual velocity model because of the single scattering assumption; however, the actual wavefield may be replaced with the reconstructed wavefield. Because the direct waveform inversion employs the parameter perturbation with the single scattering assumption, the inversion result depends on the initial setup of the velocity model as the reference medium.

In one exemplary embodiment, operation 415 may include obtaining the parameter perturbation from the virtual scattering source and the reconstructed reference wavefield. Operation 415 may include obtaining the parameter perturbation by applying the Newton's method or the least-squares method to the objective function.

The parameter perturbation, $\Delta s_k$, is obtained from the virtual scattering sources and reconstructed wavefields. The impedance difference matrix between the impedance matrices of the actual and reference velocity models, $\Delta S$, which includes the parameter perturbation in the diagonal elements, may be computed.

$$\Delta s = -\omega^2 \left( \frac{1}{v^2} - \frac{1}{v_{ref}^2} \right)$$

are the diagonal elements, which are proportional to the parameter perturbations between the actual and reference velocity models. Equation 11 may be then rewritten as Equation 18 to obtain the impedance difference matrix $\Delta S$.

$$\Delta S u(x) = -f'(x) \quad (18)$$

u(x) is the reconstructed wavefield, which is the sum of reference and scattered wavefields. The actual wavefield at the whole gridpoints may be replaced by the reconstructed wavefield at the whole gridpoints. This replacement allows the direct inversion to overcome the limitation of seismic data being only recorded at the receiver positions from the field exploration.

The direct waveform inversion method provides the parameter perturbations through $\Delta s$ of Equation 18 and updates the reference velocity model. In Equation 18, the impedance difference matrix $\Delta S$ is computed from the virtual scattering sources f'(x) and the reconstructed wavefields u(x) for a single frequency with various shot gathers. Because the components of complex number $\Delta s$ are independent of each other, Equation 18 is a block system which is solved component by component.

The Newton's method of optimization and the least-squares method may be used to minimize the residual between the left- and right-hand sides of Equation 18 across various shot gathers. The objective function is the sum of residuals for various shot gathers because the virtual scattering sources f'(x) and the reconstructed wavefields u(x) are obtained from each of shot gathers. The objective function for $\Delta s$ is given as follows:

$$E = \frac{1}{2}\sum^{shots} \delta r_k \overline{\delta r_k} \quad (19)$$

The residual $\delta r_k$ is represented as follows:

$$\delta r_k = \Delta s_k u_k + f_k^v \quad (20)$$

In Equation 20, $\Delta s_k$, $u_k$, and $f_k^v$, respectively, denote the elements of $\Delta S$, u and f' corresponding to the k-th gridpoint in the velocity model. Because the direct waveform inversion method is performed in the frequency domain, the variables are complex numbers as follows:

$$\Delta s_k = a + ib \quad (21)$$

$$u_k = c + id \quad (22)$$

$$f_k^v = e + ig \quad (23)$$

In Equations 21, 22, and 23, $\Delta s_k$ is represented as a complex number because it is a diagonal element of the impedance difference matrix $\Delta S$. However, the parameter perturbation may be a real number because it corresponds to the difference between the actual and reference velocities. Therefore, only the real part of $\Delta s$ may be required to update the reference velocity model. By applying the Newton's method or the least-squares method to Equation 19, the following equation, Equation 24, to update the parameter perturbation at the k-th gridpoint in the velocity model as a complex number may be obtained:

$$(\Delta s_k)_{n+1} = (\Delta s_k)_n - H^{-1}\nabla E \quad (24)$$

In Equation 24, the Hessian matrix H is as follows:

$$H = \begin{bmatrix} \frac{\partial^2 E}{\partial a^2} & \frac{\partial^2 E}{\partial a \partial b} \\ \frac{\partial^2 E}{\partial b \partial a} & \frac{\partial^2 E}{\partial b^2} \end{bmatrix} \quad (25)$$

The gradient vector $\nabla E$ is as follows:

$$\nabla E = \begin{bmatrix} \frac{\partial E}{\partial a} & \frac{\partial E}{\partial b} \end{bmatrix}^T \quad (26)$$

Therefore, Equation 24 may be rewritten as follows:

$$\begin{bmatrix} a_{n+1} \\ b_{n+1} \end{bmatrix} = \begin{bmatrix} a_n \\ b_n \end{bmatrix} - \frac{1}{\sum(c^2+d^2)} \begin{bmatrix} \sum\{a_n(c^2+d^2)+(ce+\mathrm{dg})\} \\ \sum\{b_n(c^2+d^2)+(cg-de)\} \end{bmatrix} \quad (27)$$

Because $a_n$ and $b_n$ on the right-hand side of Equation 27 goes to 0, the resultant equation is composed of only c, d, e, and g on the right-hand side. $\Delta s_k$ may be represented as a complex number using $f_k^v$ and $u_k$.

$$\Delta s_k = -\frac{\sum\{(ce+\mathrm{dg})+i(cg-de)\}}{\sum(c^2+d^2)} = -\frac{\sum(f_k^v \overline{u_k})}{\sum(u_k \overline{u_k})} \quad (28)$$

The reference velocity model may be updated after the diagonal elements of the impedance difference matrix, $\Delta s$, are obtained from Equation 28. Because the parameter perturbation is a real number, only the real part of $\Delta s_k$ is employed to update the reference velocity.

In one exemplary embodiment, operation 416 may include updating the reference velocity model by using data, collected from at least one of the source and receivers, and through the obtained parameter perturbation.

The following equation, Equation 29, shows how to update the reference velocity model with $\Delta s_k$:

$$\frac{1}{v_k^2} = \frac{1}{v_{k,ref}^2} - \frac{\mathrm{Re}\{\Delta s_k\}}{\omega^2} \quad (29)$$

The proposed direct waveform inversion may, first, formulate the virtual scattering source from the data residual after computing the modelled data in the reference velocity model through Equations 10 and 17. Secondly, the direct waveform inversion may compute the scattered wavefield by propagating the virtual scattering source in the reference velocity model through Equation 12, and reconstruct the total wavefield as the sum of reference and scattered wavefields through Equation 11. Finally, the direct waveform inversion may obtain the parameter perturbation from the virtual scattering sources and reconstructed wavefields through Equation 28 and update the reference velocity model through Equation 29.

Figure 6:
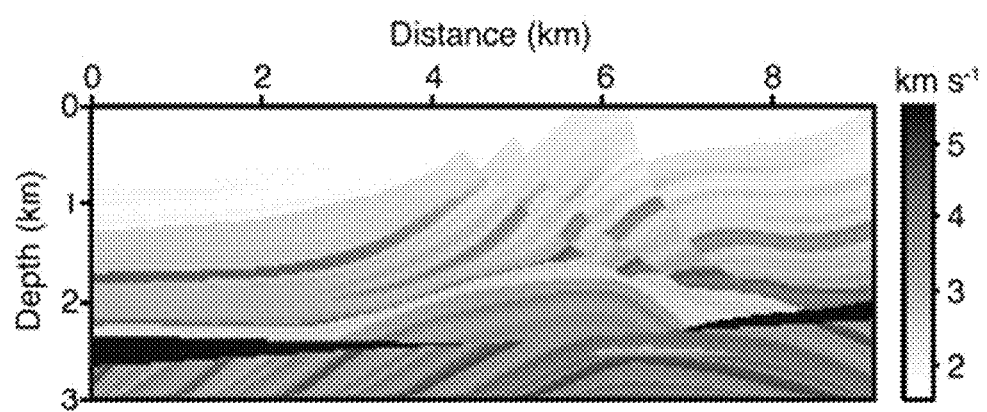
FIG. 6 is a diagram illustrating the Marmousi velocity model.

FIG. 6 is a diagram illustrating the Marmousi velocity model.

Specifically, FIG. 6 illustrates the Marmousi velocity model where the direct waveform inversion method is applied, so as to test the direct waveform inversion method that is proposed in the present disclosure.

FIG. 7 is a diagram illustrating (a) that shows a shot-gather seismogram, and (b) that shows a frequency spectrum of the Marmousi data set.

Referring to (a) in FIG. 7, the synthetic field data set may be generated by 192 shots with an interval of 48 m. Each shot gather contains 384 receives with an interval of 24 m. The finite-difference scheme is employed, and the absorbing boundary condition is applied to the left, right, and bottom sides of the model. Free surface condition is applied at the top nodes. The direct waveform inversion may be performed in the frequency domain.

Referring to (b) in FIG. 7, the synthetic field data have a frequency spectrum that ranges from 0 to 40 Hz. During the inversion process, 161 frequencies ranging from 4.0 to 20.0 Hz with a frequency interval of 0.1 Hz may be used, and the source wavelet signature may be estimated in the frequency domain by the Newton's method or the least-squares method.

Figure 8:
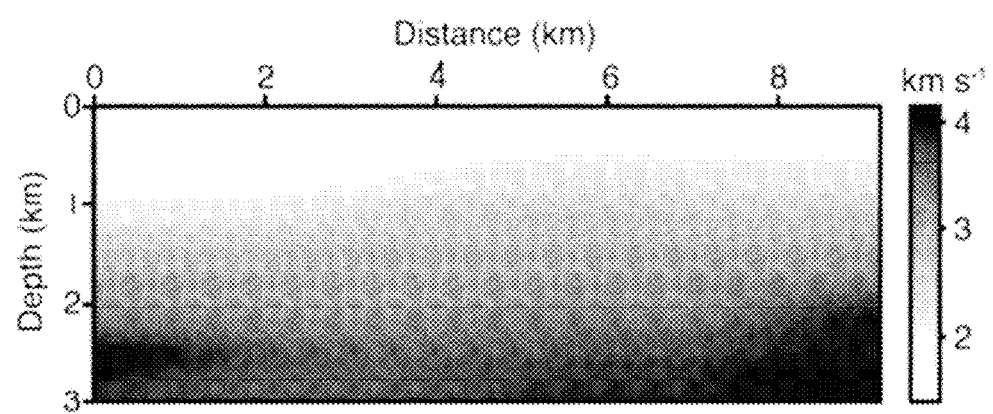
FIG. 8 is a diagram illustrating an initial velocity model.

FIG. 8 is a diagram illustrating an initial velocity model.

Referring to FIG. 8, the smoothed velocity structure of the Marmousi model is used as an initial velocity model.

Figure 9:
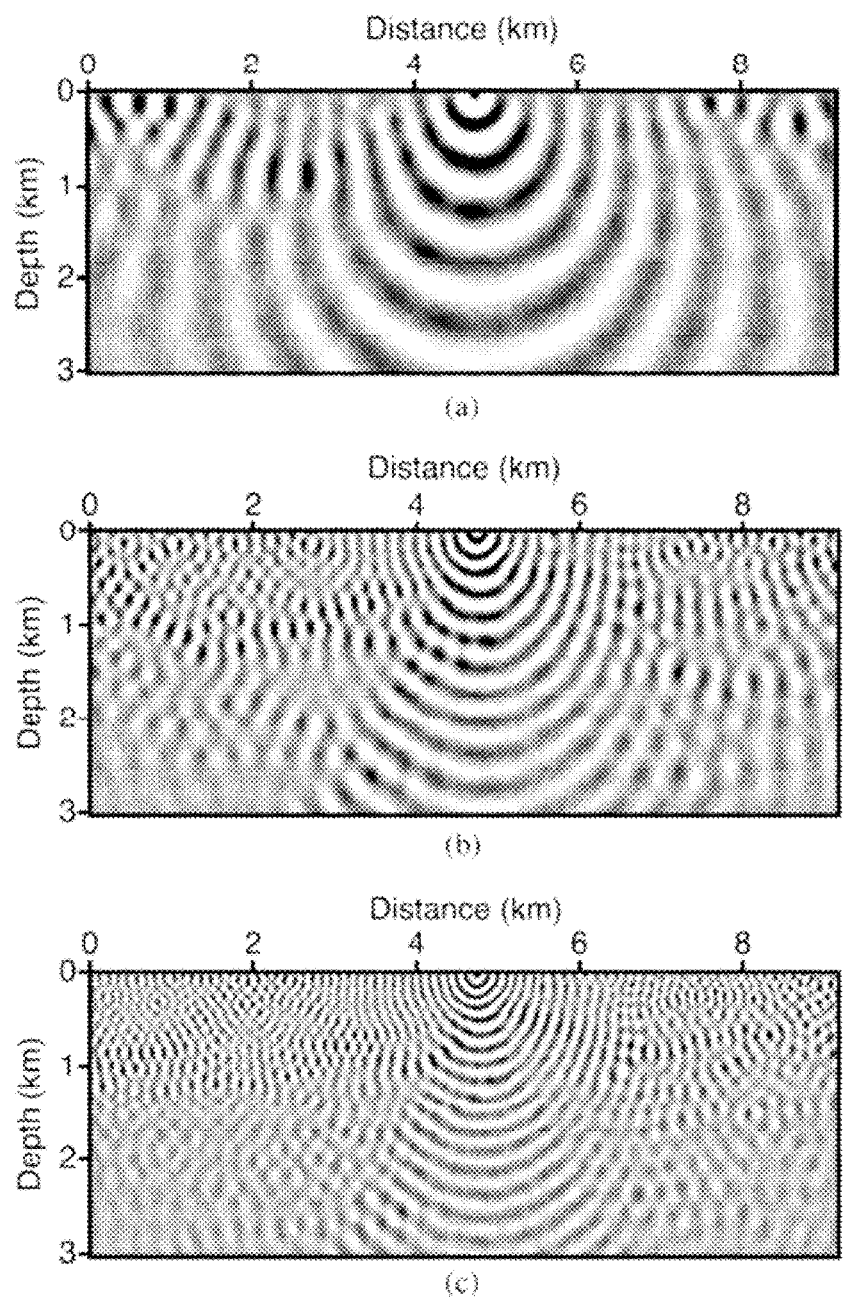
FIG. 9 is a diagram illustrating the reference wavefields propagated at a shot location of 4.8 km in the initial velocity model for frequencies of (a) 5.0 Hz, 10.0 Hz, and 15.0 Hz, respectively.

FIG. 9 is a diagram illustrating the reference wavefields propagated at a shot location of 4.8 km in the initial velocity model for frequencies of (a) 5.0 Hz, 10.0 Hz, and 15.0 Hz, respectively.

FIG. 9 illustrates the frequency-domain wavefields propagated in the initial velocity model, which are referred as reference wavefields in Equation 10. The inversion method is to directly obtain the velocity model perturbation from the virtual scattering source and the reconstructed wavefield. Using the Lippmann-Schwinger equation, the virtual scattering source vector f'(x) may be computed from data residual.

Figure 10:
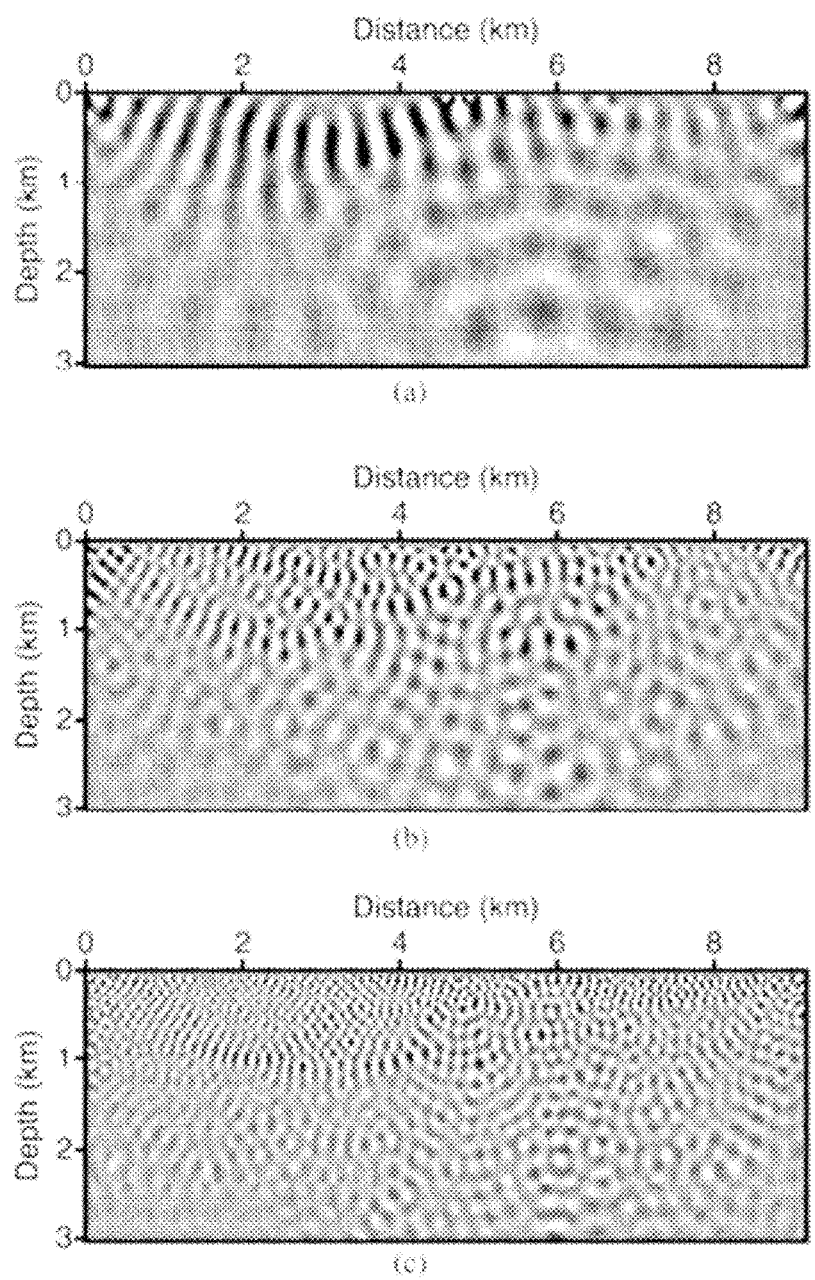
FIG. 10 is a diagram illustrating the virtual scattering sources for frequencies of (a) 5.0 Hz, (b) 10.0 Hz, and (c) 15.0 Hz, which are obtained from the data residuals corresponding to a point source of shot location at 4.8 km.

FIG. 10 is a diagram illustrating the virtual scattering sources for frequencies of (a) 5.0 Hz, (b) 10.0 Hz, and (c) 15.0 Hz, which are obtained from the data residuals corresponding to a point source of shot location at 4.8 km.

FIG. 10 illustrates the virtual scattering sources distributed in the whole gridpoints of the medium, which contribute to the scattered wavefields $\Delta u(x)$. The multifrontal matrix solver may be employed to solve forward modelling and the GMRES routines to obtain the virtual scattering source in Equation 17. Because the multifrontal solver decomposes the inverse system matrix and stores it on the random access memory (RAM), the multifrontal solver may calculate multiple number of right-hand side vectors until destroying the matrix decomposition.

Besides, it is not required to store the inverse of complex impedance matrix to obtain the virtual scattering source, because multiplying the inverse matrix is equivalent to solve the system matrix with the given vector. Therefore, the direct inversion method does not require much more memory compared to that for the full waveform inversion.

The direct inversion method requires the less number of model updates because it updates the velocity model once per frequency. However, the computation of virtual scattering source requires relatively long computing time with the multifrontal solver and GRMES routines.

In the inversion test above, the computing time of matrix decomposition with the multifrontal solver is about 0.32 s and that of the system matrix solving with the decomposed matrix for a right-hand side vector is about 0.04 s. On the other hand, the computing time of virtual scattering source is about 11.96 s because of the iterative system matrix solving about 200 times with Equation 17.

Figure 11:
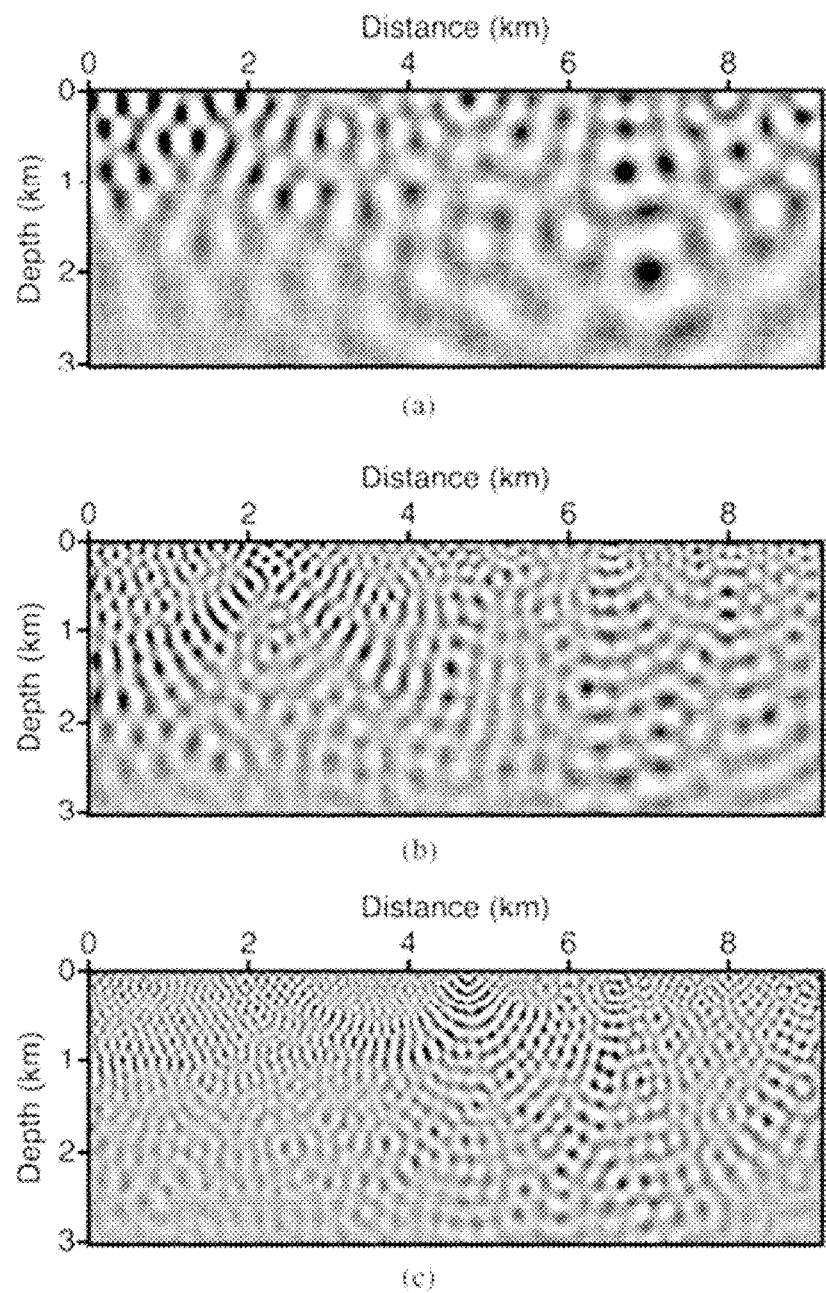
FIG. 11 is a diagram illustrating the scattered wavefields for frequencies of (a) 5.0 Hz, (b) 10.0 Hz, and (c) 15.0 Hz, which are generated by propagating the virtual scattering sources illustrated in 10.

FIG. 11 is a diagram illustrating the scattered wavefields for frequencies of (a) 5.0 Hz, (b) 10.0 Hz, and (c) 15.0 Hz, which are generated by propagating the virtual scattering sources illustrated in 10.

Referring to FIG. 11 and Equation 12, the scattered wavefield Δu(x) is obtained by propagating the virtual scattering source in the reference velocity model.

Figure 12:
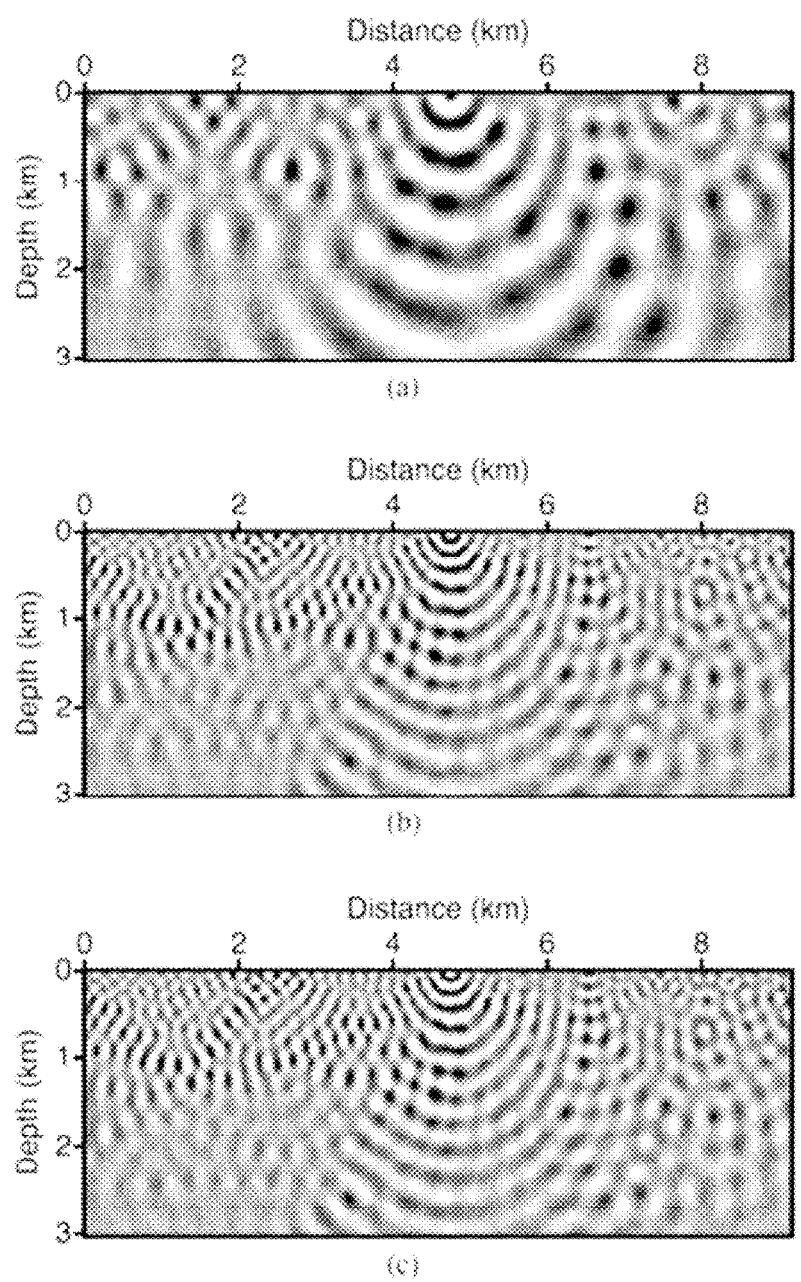
FIG. 12 is a diagram illustrating the reconstructed wavefields at a shot location of 4.8 km for frequencies of (a) 5.0 Hz, (b) 10.0 Hz, and (c) 15.0 Hz, which are equivalent to the sum of the reference wavefields in FIG. 9 and the scattered wavefields in FIG. 10.

FIG. 12 is a diagram illustrating the reconstructed wavefields at a shot location of 4.8 km for frequencies of (a) 5.0 Hz, (b) 10.0 Hz, and (c) 15.0 Hz, which are equivalent to the sum of the reference wavefields in FIG. 9 and the scattered wavefields in FIG. 10.

Referring to FIG. 12, the wavefields propagated in the structure just under the surface are replaced by the reconstructed wavefields, which are the sum of the reference and scattered wavefields.

Figure 13:
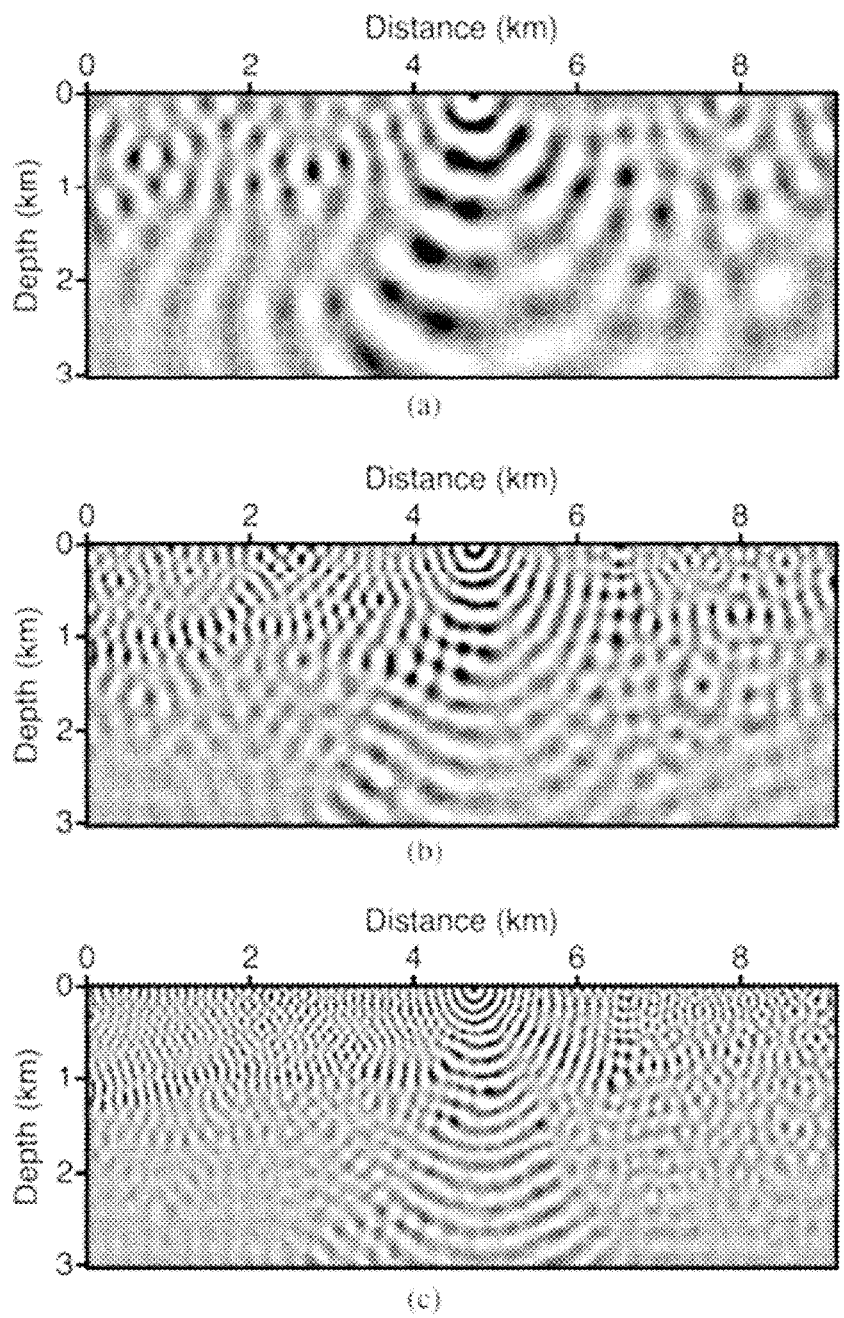
FIG. 13 is a diagram illustrating the true wavefields at a shot location of 4.8 km for frequencies of (a) 5.0 Hz, (b) 10.0 Hz, and (c) 15.0 Hz, which are propagated in the true velocity model.

FIG. 13 is a diagram illustrating the true wavefields at a shot location of 4.8 km for frequencies of (a) 5.0 Hz, (b) 10.0 Hz, and (c) 15.0 Hz, which are propagated in the true velocity model.

Referring to FIG. 13, the reconstructed wavefields are similar to the actual wavefields.

Figure 14:
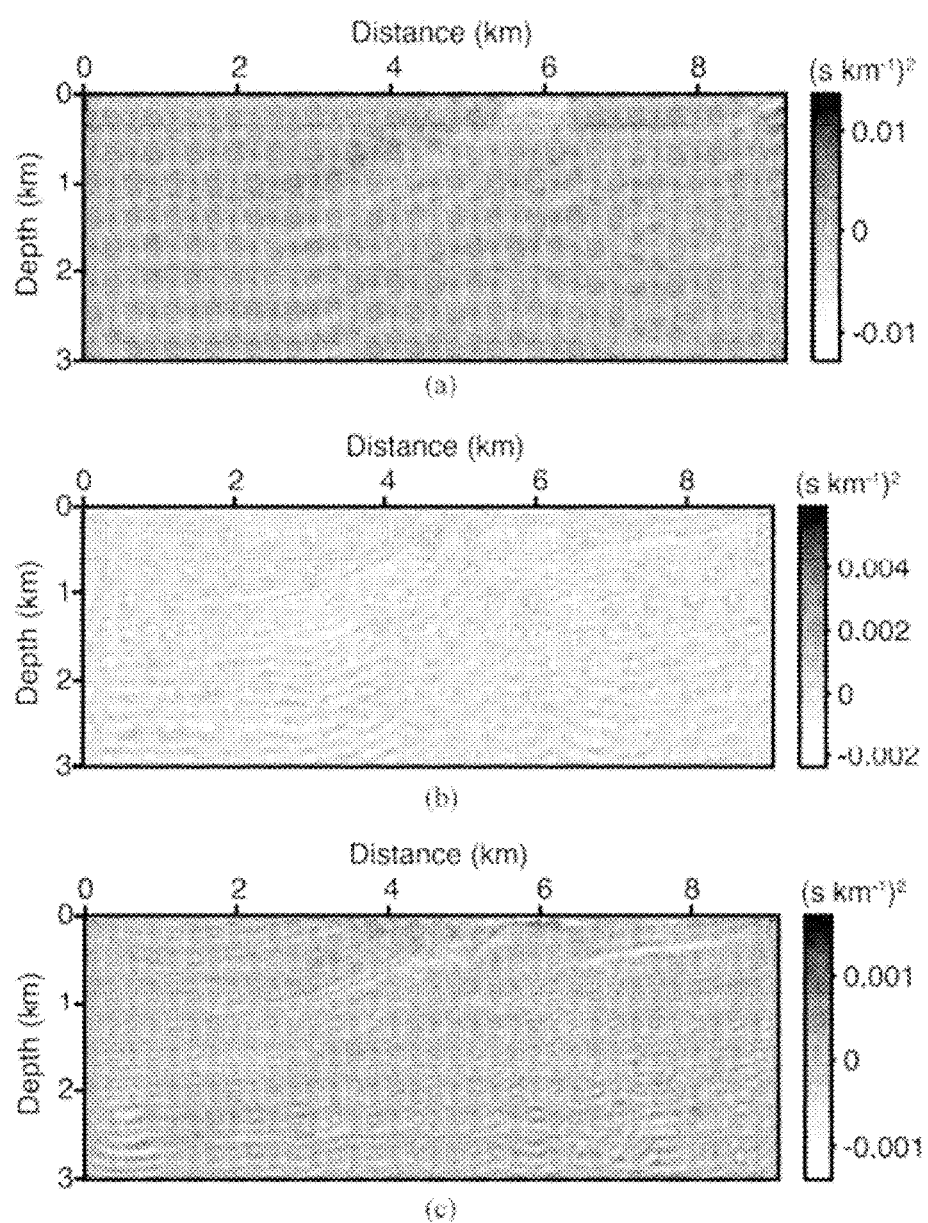
FIG. 14 is a diagram illustrating the parameter perturbation for frequencies of (a) 5.0 Hz, (b) 10.0 Hz, and (c) 15.0 Hz.

FIG. 14 is a diagram illustrating the parameter perturbation for frequencies of (a) 5.0 Hz, (b) 10.0 Hz, and (c) 15.0 Hz.

Referring to FIG. 14 and Equation 28, the parameter perturbations are computed as model perturbations using the virtual scattering sources and the reconstructed wavefields. The initial velocity model may be updated by adding the velocity model perturbation using Equation 29. The processes, from the source signature estimation to the velocity model update, are performed for a single frequency. The velocity update is carried out before moving on to the next frequency, and the frequencies are considered sequentially from low to high.

Figure 15:
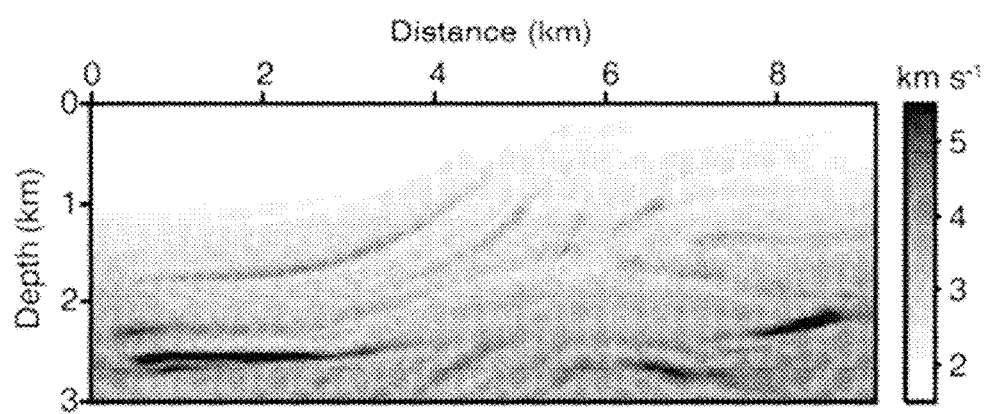
FIG. 15 is a diagram illustrating the inverted velocity model.

FIG. 15 is a diagram illustrating the inverted velocity model.

Referring to FIG. 15, the inverted velocity model is analogous to the true velocity model with stratified layers and structures, and also shows an anticline structure in the bottom-center of the true model.

Figure 16:
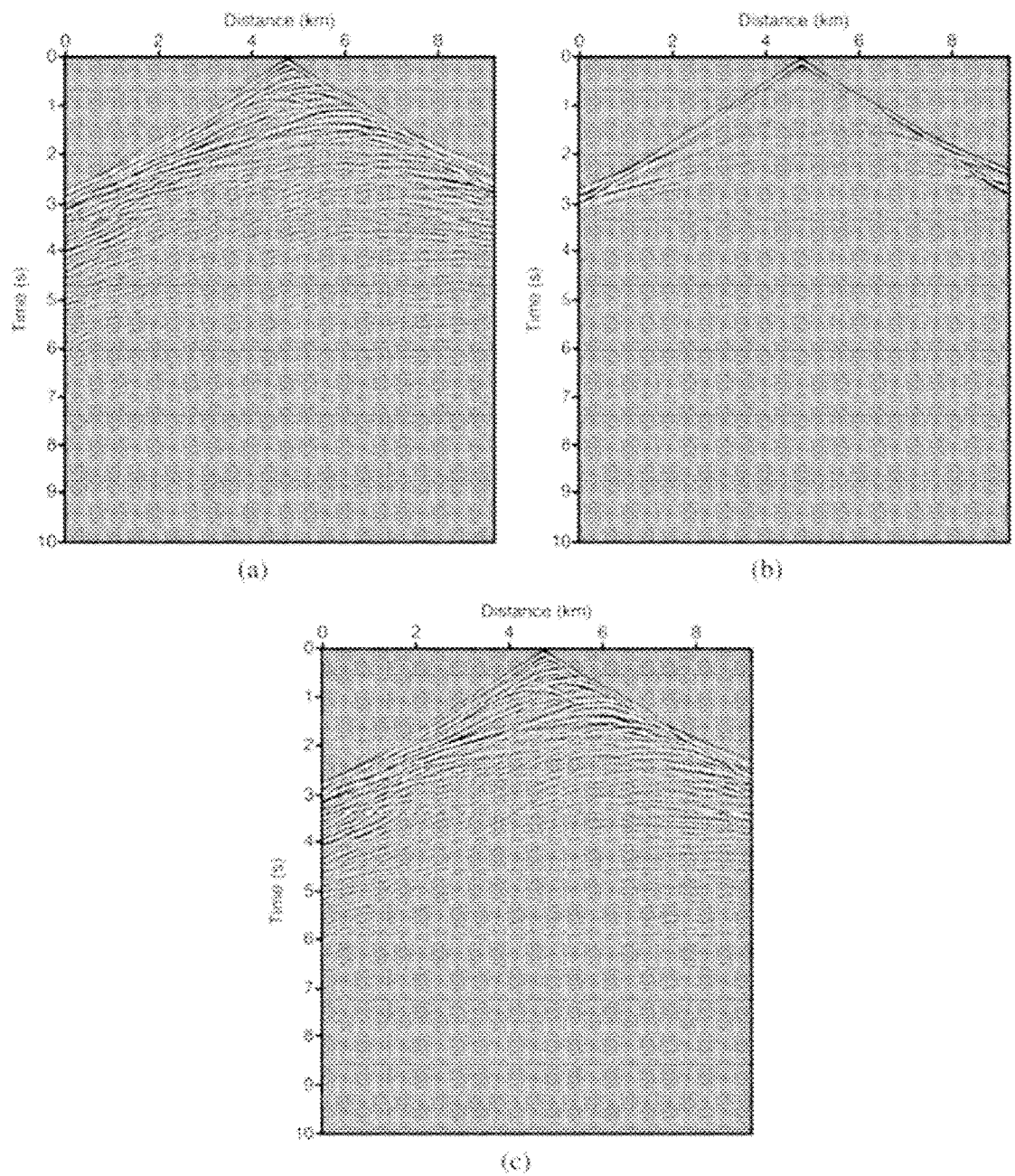
FIG. 16 is a diagram illustrating (a) a shot-gather seismogram of the synthetic field data, (b) a seismogram synthesized in the initial velocity model, and (c) a seismogram recovered by the direct waveform inversion at a shot location of 4.8 km.

FIG. 16 is a diagram illustrating (a) a shot-gather seismogram of the synthetic field data, (b) a seismogram synthesized in the initial velocity model, and (c) a seismogram recovered by the direct waveform inversion at a shot location of 4.8 km.

The resultant velocity model of direct waveform inversion is validated by the synthetic seismograms generated in the inversion process. The time-domain seismograms are synthesized by the inverse Fourier transform of the frequency-domain reconstructed wavefields. The recovered synthetic seismograms are equivalent to propagations of the estimated source wavelet in the inverted velocity model, and match the corresponding shot-gather seismograms of the field data.

FIG. 17 is a diagram illustrating shot-gather seismograms of the noise-contaminated Marmousi data set with signal-to-noise (S/N) ratio of (a) 12.75 and (b) 25.50.

The direct waveform inversion for the noise-contaminated data may be tested to check the sensitivity of inversion result on incoherent noise. Referring to FIGS. 2 and 12, Gaussian random noise is added to the Marmousi data set with S/N ratio of 12.75 and 25.50. The noisy data with S/N ratio of 12.75 cannot describe the significant reflection or refraction signals because of strong incoherent noise. The direct waveform inversion is performed under the same conditions as the clean Marmousi data set test.

Figure 18:
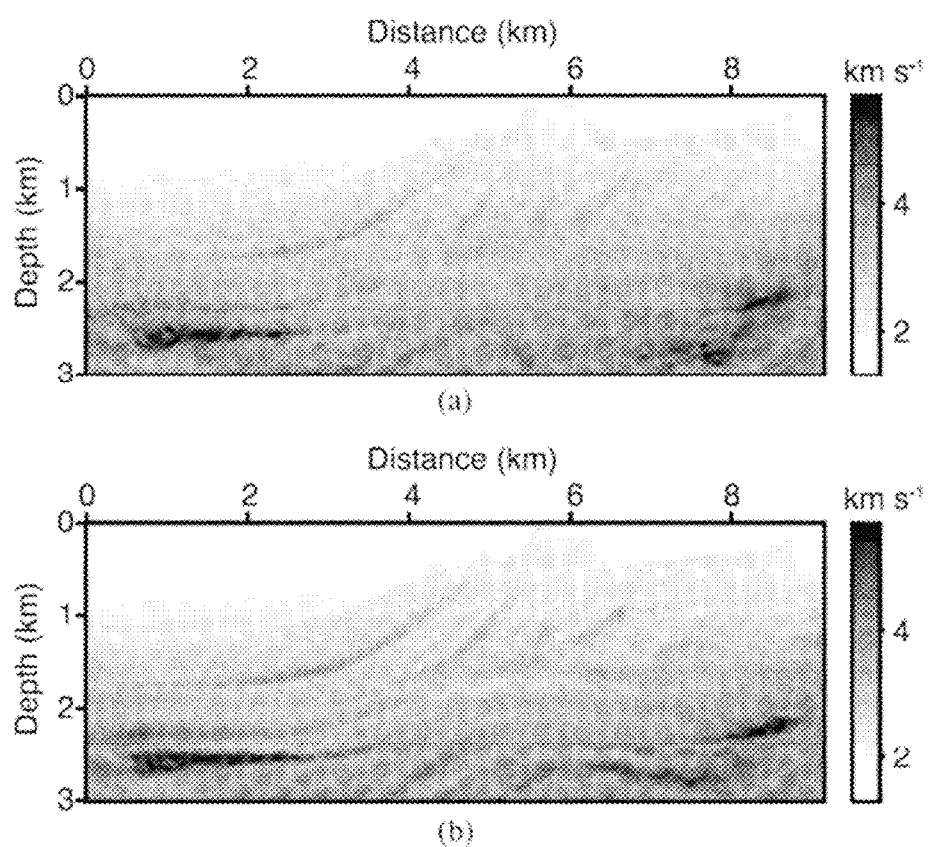
FIG. 18 is a diagram illustrating the inverted velocity model for the noise-contaminated Marmousi data set with S/N ratio of (a) 12.75 and (b) 25.50.

FIG. 18 is a diagram illustrating the inverted velocity model for the noise-contaminated Marmousi data set with S/N ratio of (a) 12.75 and (b) 25.50.

FIG. 18 illustrates the inverted results. Because the significant signals in the data are contaminated by the random noise, the waveform inversion results are affected by the amplitudes of noisy data. In FIG. 18, the inverted result with the data of S/N ratio 25.50 more precisely represents the stratified and anticline structures better than that of S/N ratio 12.75.

The direct waveform inversion result depends on the quality of input data such as amplitudes of signals because the inversion method takes advantage of data residuals to generate the virtual scattering sources and scattered wavefields. If the input seismic data are contaminated by noise, the virtual scattering sources are formulated to reconstruct the scattered wavefields including noise signals in the input data.

On the other hand, multiples in the input data do not need to be eliminated because this inversion method employs the solutions of full wave equation as forward modelling in the whole process, as full waveform inversion does. However, coherent noise should be removed properly, and if not, the direct inversion is tempted to produce virtual scattering sources for the scattered wavefields including the coherent noise. However, if the input data with incoherent noise have good S/N ratio, which is high enough to preserve the significant signals, then the direct waveform inversion can provide reasonable solutions of velocity models.

Direct waveform inversion is a method based on perturbation theory to estimate P-wave velocities of subsurface media from seismic data. The inversion method employs the data residual in a manner similar to full waveform inversion; however, the inversion method does not exploit the steepest descent approach which is iteratively solved to reduce the data residual. The computational cost required to perform the direct inversion can be less than that of full waveform inversion based on the steepest descent method, which requires numerous forward modelling and backpropagation steps. Direct waveform inversion does not require a step length to update the velocity model because it directly inverts the parameter perturbation. However, the velocity updates may be adjusted by multiplying the value that is less than 1.

The inversion process creates the modelled seismograms similar to those of the field data for the corresponding shot gathers. The synthetic shot-gather seismograms generated in the inversion process verify that the inverted velocity model provides a reasonable solution.

In the real field data application, noises in the seismic data should be carefully removed. The most of intermediate outputs are related to the virtual scattering source, which is obtained from the data residual with single scattering assumption. Because of this fact, amplitudes of signals in the input data can significantly affect to the inverted results. The test results with the noise-contaminated data show that low S/N ratio of input data can cause inaccurate estimations of parameter perturbations. In order to obtain good inverted velocity models, noise signals in the input data—in particular, coherent noises—should be eliminated without ruining the significant signals, such as reflections or refractions.

According to the proposed invention in this present disclosure, since the steepest descent method is not used, which is iteratively solved to reduce data residual, the computational cost required to perform the waveform inversion can be reduced.

In addition, according to the proposed in this present disclosure, a step length is not required to update a velocity model because parameter perturbation is directly inverted.

Moreover, an accurate velocity model may be acquired regardless of the size of the difference between an initial velocity model and the medium properties of the medium to be inverted.

Furthermore, according to the proposed invention in this present disclosure, by setting again the velocity model, which is updated while a frequency band is changed, as the initial velocity model so as to perform the inversion, the final velocity model similar to the actual medium may be acquired.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A seismic imaging apparatus to perform iterative application of direct waveform inversion to image a subsurface structure of an area to be measured, the seismic imaging apparatus comprising:
   a waveform inverter implemented by a signal processor and configured to
      update a reference velocity model while changing a frequency band in a set order, by using parameter perturbation that is obtained from a virtual scattering source and an updated reference wavefield, wherein the reference velocity model updated in a previous frequency band is set as the reference velocity model of a next frequency band, which is then updated, and
      set again the reference velocity model, updated in a last frequency band, as the reference velocity model of a first frequency band so as to set a velocity model, updated in the set order in a previous frequency band, as the reference velocity model of a next frequency band, which is then updated; and
   a subsurface structure imager implemented by the signal processor and configured to image a subsurface structure by using the updated reference velocity model.

2. The seismic imaging apparatus of claim 1, wherein the waveform inverter is further configured to:
   in response to a frequency being a complex number, change the frequency band while changing, in the set order, each one of a damping coefficient which adjusts an imaginary part, and a size of a real part.

3. The seismic imaging apparatus of claim 1, wherein the waveform inverter comprises:
   a reference wavefield calculator implemented by the signal processor and configured to calculate a reference wavefield that is a solution of a wavefield equation by using data collected from at least one of a source and receivers;
   a virtual scattering source obtainer implemented by the signal processor and configured to obtain the virtual scattering source from a data residual, which is the difference between actual and reference wavefields;
   a scattered wavefield calculator implemented by the signal processor and configured to calculate a scattered wavefield from the virtual scattering source;
   a reference wavefield reconstructor implemented by the signal processor and configured to reconstruct the reference wavefield by summing the reference wavefield and the scattered wavefield;
   a parameter perturbation obtainer implemented by the signal processor and configured to obtain the parameter perturbation from the virtual scattering source and the reconstructed reference wavefield; and
   a reference velocity model updator implemented by the signal processor and configured to update the reference velocity model by using data collected from at least one of the source and receivers, and through the obtained parameter perturbation.

4. The seismic imaging apparatus of claim 3, wherein the reference wavefield calculator is further configured to calculate the reference wavefield from a wave equation of a frequency domain, which is transformed from the wave equation of a time domain through Fourier transform, by using a finite element method or a finite difference method.

5. The seismic imaging apparatus of claim 3, wherein the virtual scattering source obtainer is further configured to obtain the virtual scattering source from an equation that is yielded from a Lippmann-Schwinger equation by using the data residual and Green's function.

6. The seismic imaging apparatus of claim 3, wherein the parameter perturbation obtainer is further configured to obtain the parameter perturbation by applying a Newton's method or a least-squares method to an objective function.

7. A seismic imaging method of performing iterative application of direct waveform inversion to image a subsurface structure of an area to be measured, the seismic imaging method comprising:
   performing waveform inversion, comprising
      updating a reference velocity model while changing a frequency band in a set order, by using parameter perturbation that is obtained from a virtual scattering source and an updated reference wavefield, wherein the reference velocity model updated in a previous frequency band is set as the reference velocity model of a next frequency band, which is then updated, and
      setting again the reference velocity model, updated in a last frequency band, as the reference velocity model of a first frequency band so as to set a velocity model, updated in the set order in a previous frequency band, as the reference velocity model of a next frequency band, which is then updated; and
   imaging a subsurface structure by using the updated reference velocity model.

8. The seismic imaging method of claim 7, wherein the performing of the waveform inversion further comprises:
   in response to a frequency being a complex number, changing the frequency band while changing, in the set order, each of a damping coefficient which adjusts an imaginary part, and a size of a real part.

9. The seismic imaging method of claim 7, wherein the performing of the waveform inversion further comprises:
   calculating a reference wavefield that is a solution of a wavefield equation by using data collected from at least one of a source and receivers;
   obtaining a virtual scattering source from a data residual, which is the difference between actual and reference wavefields;
   calculating a scattered wavefield from the virtual scattering source;
   reconstructing the reference wavefield by summing the reference wavefield and the scattered wavefield;
   obtaining the parameter perturbation from the virtual scattering source and the reconstructed reference wavefield; and updating the reference velocity model by using data collected from at least one of the source and receivers, and through the obtained parameter perturbation.

10. The seismic imaging method of claim 9, wherein the calculating of the reference wavefield further comprises calculating the reference wavefield from a wave equation of a frequency domain, which is transformed from the wave equation of a time domain through Fourier transform, by using a finite element method or a finite difference method.

11. The seismic imaging method of claim 9, wherein the obtaining of the virtual scattering source comprises obtaining the virtual scattering source from an equation that is yielded from a Lippmann-Schwinger equation by using the data residual and Green's function.

12. The seismic imaging method of claim 9, wherein the parameter perturbation is obtained by applying a Newton's method or a least-squares method to an objective function.

* * * * *